(12) United States Patent
Kingston et al.

(10) Patent No.: US 11,544,697 B2
(45) Date of Patent: Jan. 3, 2023

(54) LOW COST CONTROL POUR

(71) Applicant: The Coca-Cola Company, Atlanta, GA (US)

(72) Inventors: Benjamin John Kingston, Atlanta, GA (US); Akhil Karibandi, Atlanta, GA (US); Chetan Polavaram, Atlanta, GA (US); Thomas Stubbs, Atlanta, GA (US); Jevawn Roberts, Atlanta, GA (US); Scott Harrison, Atlanta, GA (US); Stan Kaplita, Atlanta, GA (US); Christopher Dennis, Atlanta, GA (US); Gregg Carpenter, Atlanta, GA (US); Joshua Casey Schwarber, Atlanta, GA (US); Tao Peng, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/622,150

(22) PCT Filed: Jun. 12, 2018

(86) PCT No.: PCT/US2018/037139
§ 371 (c)(1),
(2) Date: Dec. 12, 2019

(87) PCT Pub. No.: WO2018/231853
PCT Pub. Date: Dec. 20, 2018

(65) Prior Publication Data
US 2020/0134960 A1    Apr. 30, 2020

Related U.S. Application Data

(60) Provisional application No. 62/575,333, filed on Oct. 20, 2017, provisional application No. 62/569,934,
(Continued)

(51) Int. Cl.
*G06Q 20/32* (2012.01)
*G06Q 20/34* (2012.01)
*G07F 13/06* (2006.01)

(52) U.S. Cl.
CPC ....... *G06Q 20/3278* (2013.01); *G06Q 20/352* (2013.01); *G07F 13/065* (2013.01)

(58) Field of Classification Search
CPC .......................... G06Q 20/3278; A47G 19/22
See application file for complete search history.

(56) References Cited

U.S. PATENT DOCUMENTS 7,649,460 B2 * 1/2010 Rodgers ........... G06K 19/07345
340/572.1
7,845,375 B2 * 12/2010 Dorney ................ B67D 1/0888
141/237
(Continued)

FOREIGN PATENT DOCUMENTS

CN    102105088 A    6/2011
CN    102741890 A    10/2012
(Continued)

OTHER PUBLICATIONS

The DIS, "A Look at Disney's Rapid Fill Mug System", Aug. 24, 2013 (Year: 2013).*
(Continued)

*Primary Examiner* — Florian M Zeender
*Assistant Examiner* — Vanessa Deligi
(74) *Attorney, Agent, or Firm* — Foley & Lardner LLP

(57) ABSTRACT

One embodiment may include a machine for providing beverages. The machine may include a reader configured to read data representative of an available balance for a user to obtain beverages from the machine from a machine-readable medium and electronics. The electronics may be configured to receive the data from the machine-readable medium in
(Continued)

response to the user positioning the machine-readable medium within reading distance of the reader, enable the user to dispense a beverage into a vessel, and update the available balance of the machine-readable medium so as to reduce or prevent the user from dispensing unlimited beverages.

18 Claims, 23 Drawing Sheets

Related U.S. Application Data filed on Oct. 9, 2017, provisional application No. 62/518,448, filed on Jun. 12, 2017.

(56) References Cited

U.S. PATENT DOCUMENTS

| | | | | |
|---|---|---|---|---|
| 8,151,832 | B1* | 4/2012 | Dorney | G07F 9/001 141/94 |
| 10,373,276 | B2* | 8/2019 | Carpenter | G07F 13/065 |
| 2005/0087255 | A1* | 4/2005 | Humphrey | G07F 7/025 141/94 |
| 2006/0032926 | A1* | 2/2006 | Baba | H01Q 1/2216 235/492 |
| 2006/0220871 | A1* | 10/2006 | Baba | G06K 19/0739 340/572.1 |
| 2007/0011041 | A1* | 1/2007 | Bourne | G07G 1/009 340/572.3 |
| 2007/0215239 | A1* | 9/2007 | Dorney | G06Q 20/342 222/146.2 |
| 2008/0206510 | A1* | 8/2008 | Huang | B29C 45/14811 264/445 |
| 2010/0125362 | A1* | 5/2010 | Canora | G07F 9/00 700/236 |
| 2011/0049180 | A1 | 3/2011 | Carpenter et al. | |
| 2011/0071830 | A1* | 3/2011 | Kim | G06K 9/00335 704/246 |
| 2011/0120316 | A1* | 5/2011 | Castellani | A47J 31/5255 99/280 |
| 2013/0284029 | A1* | 10/2013 | Reed | G06Q 30/0241 99/280 |
| 2014/0053944 | A1 | 2/2014 | Wang | |
| 2016/0092851 | A1* | 3/2016 | De Berg Hewett | G06Q 20/047 705/15 |
| 2016/0255991 | A1* | 9/2016 | Givens, Jr. | B01F 3/04808 |
| 2017/0049261 | A1* | 2/2017 | Ochoa | B01F 35/2206 |
| 2020/0187689 | A1* | 6/2020 | Baarman | H01Q 1/00 |
| 2021/0052093 | A1* | 2/2021 | Fritz | A47G 19/2261 |

FOREIGN PATENT DOCUMENTS

| | | |
|---|---|---|
| EP | 0 708 413 A1 | 4/1996 |
| KR | 20140096689 A | 8/2014 |
| TW | 201128537 A * | 8/2011 |
| WO | WO-2016/174265 A1 | 11/2016 |

OTHER PUBLICATIONS

International Search Report corresponding to PCT/US2018/037139, dated Aug. 31, 2018, 2 pages.
European Patent Application No. 18818035.0, Extended European Search Report dated Jan. 29, 2021, 113 pgs.

* cited by examiner

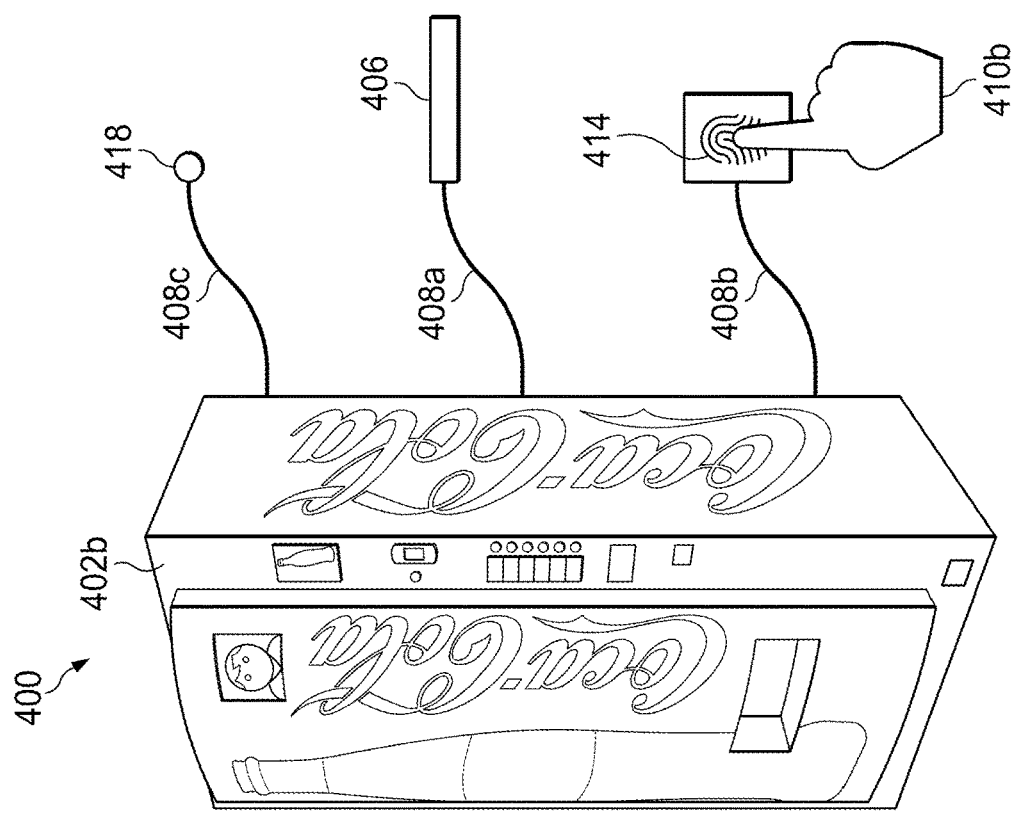
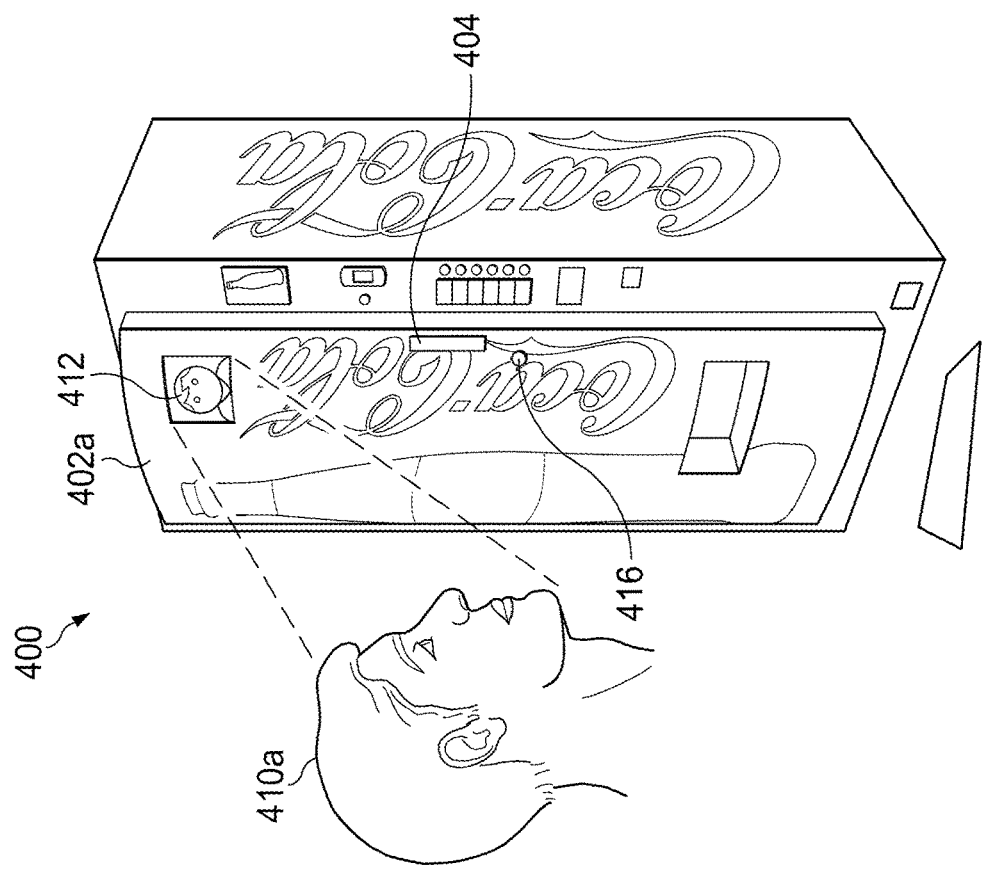
FIG. 4B
FIG. 4A

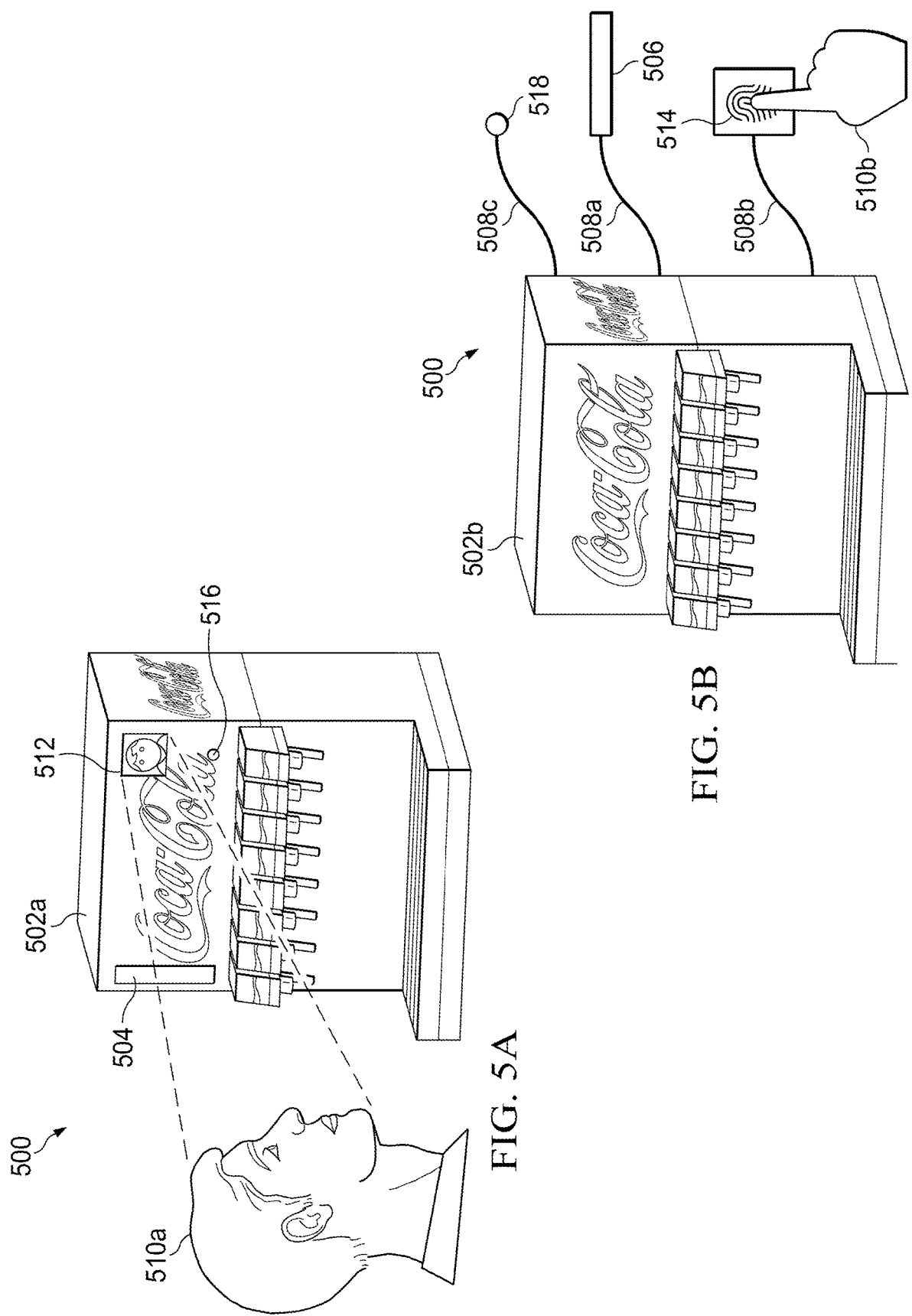

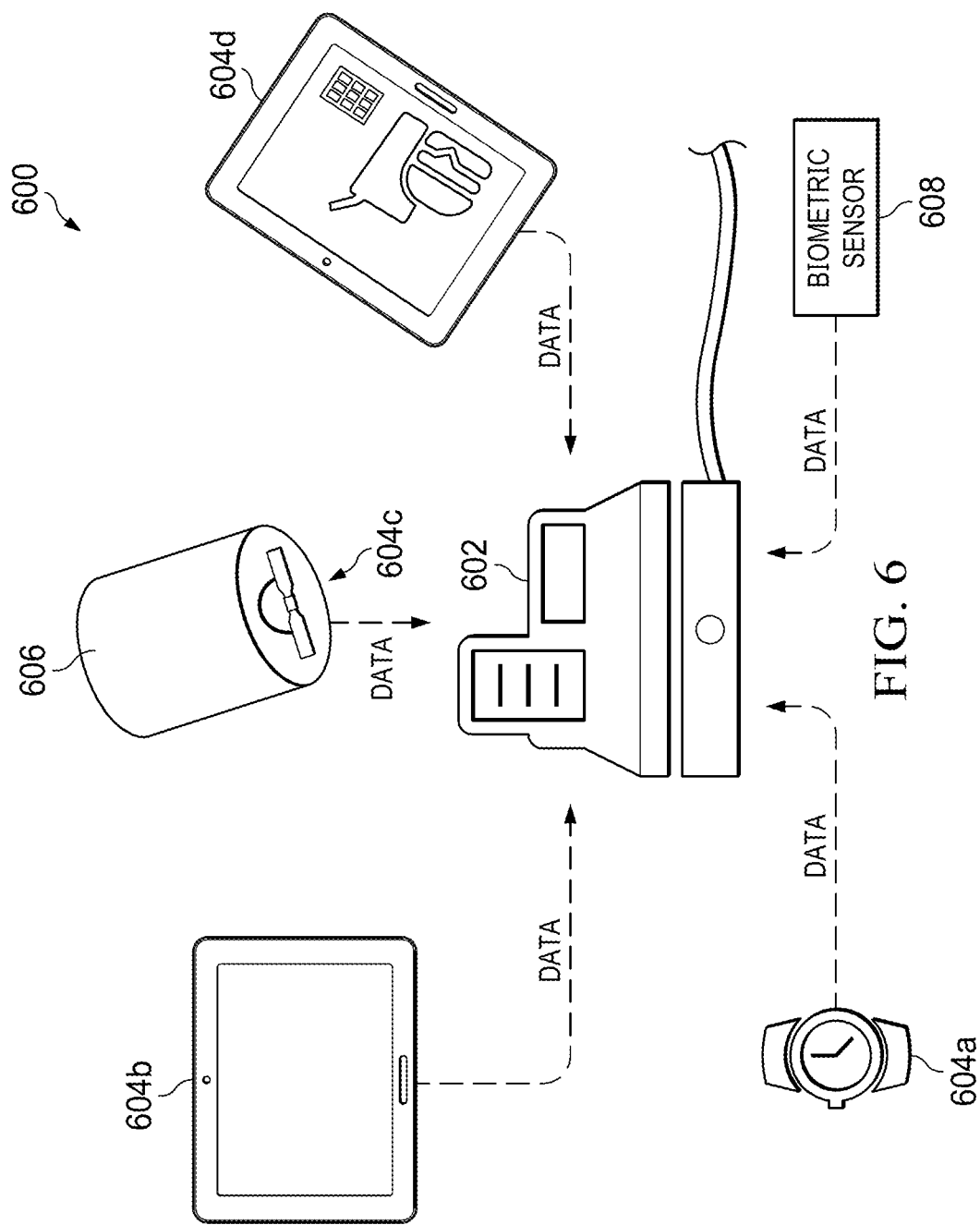

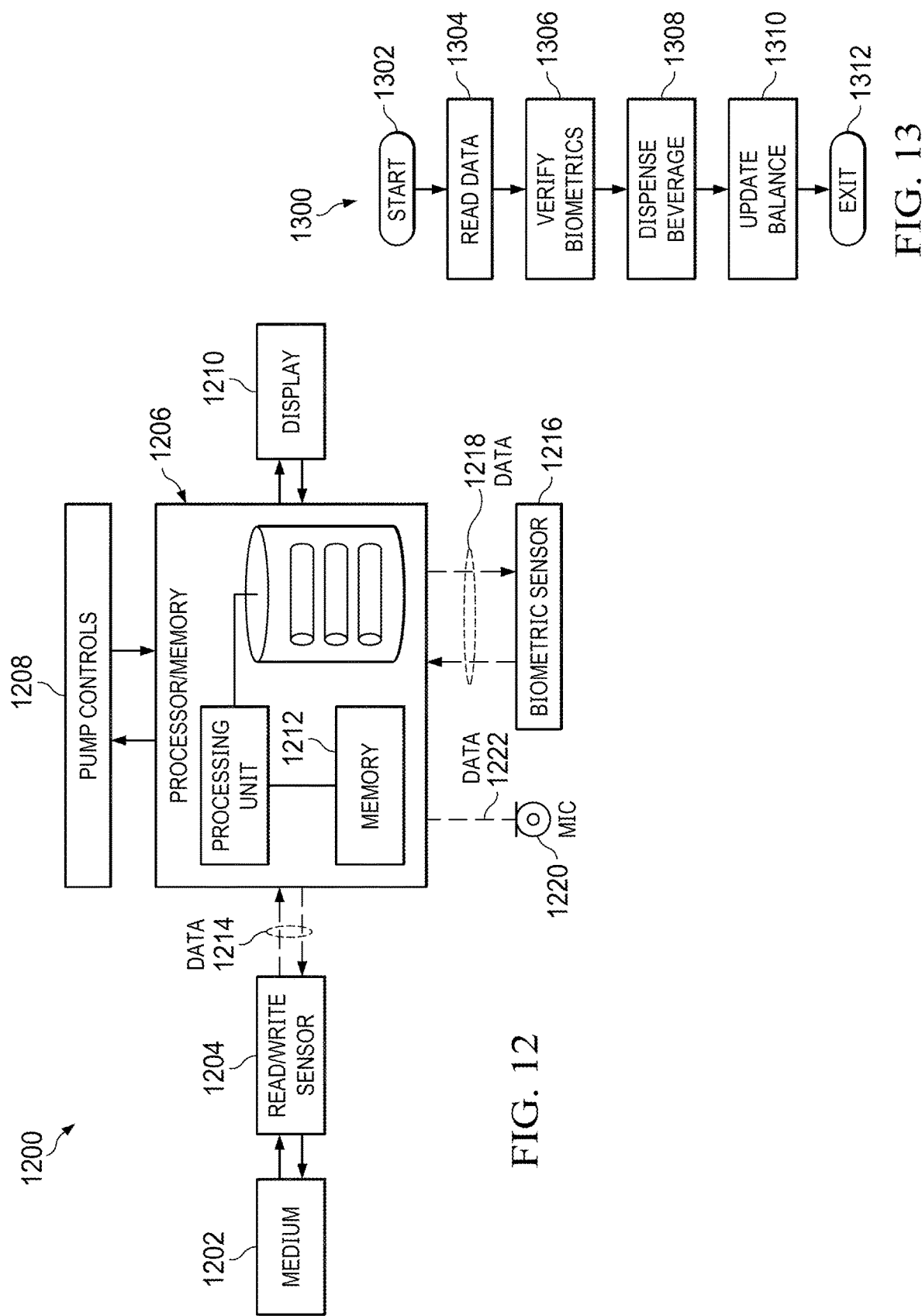

LOW COST CONTROL POUR

REFERENCE TO RELATED APPLICATIONS

[0001] This application is a 371 National Phase Application that claims the benefit of International Patent Application No. PCT/US2018/037139 filed Jun. 12, 2018, which claims the benefit of U.S. Provisional Application No. 62/518,448, filed on Jun. 12, 2017; U.S. Provisional Application No. 62/569,934, filed on Oct. 9, 2017; and U.S. Provisional Application No. 62/575,333, filed Oct. 20, 2017, the contents of which are herein incorporated by reference in their entirety.

FIELD OF THE INVENTION

The present invention relates to a beverage dispenser and to controlled pouring of a beverage using biometric recognition along with voice control of the beverage dispenser.

BACKGROUND OF THE INVENTION

Beverage dispensers are used in a variety of venues. A common type of beverage dispenser found in service industry venues are self-serve beverage dispensers. Users of self-serve beverage dispensers are able to handle refilling and modifying of beverage orders without hindering the venue's time and resources. In addition to being more efficient, providing refills at a discounted price or at no value is a good marketing tool for the venue.

Beverage dispensers are also continuing to improve technology, allowing venues to better control variability and access to beverages. Having a self-serve beverage dispenser option allows venues to streamline a portion of the service they are providing. For example, soda dispensers and/or coffee dispensers in a restaurant allow for employees of the restaurant to focus on food preparation and customer service, as opposed to constantly refilling beverages for the customers.

However, unfettered access to the beverage dispenser also provides a series of concerns. For example, self-serve beverage dispensers are difficult to monitor and may limit a venue to choosing between employee handling of refills or unlimited refills without any form of regulation or compensation.

Additionally, government regulations in certain geopolitical locations may require a venue to limit an amount of the refills that are provided. Traditional methods of regulating a quantity of dispensed beverages, such as using a radiofrequency identification device (RFID) affixed to a cup, can be both expensive and burdensome in manufacturing.

Venues that are providing self-serve beverage dispensers, such as the service industry, are searching for solutions that are both affordable and efficient. In the scenario of long-term use beverage vessels, such as ceramic coffee cups, higher cost is less of an issue. However, when the venue is evaluating a method for providing inexpensive and disposable beverage vessels, existing technology is cost prohibitive.

Additionally, modifications to existing self-serve beverage dispensers should provide some level of uniformity so that user interaction with the beverage dispensers does not require a learning process across common dispensers. Not only are existing technologies cost prohibitive, as previously described, dispenser use is not sufficiently intuitive. Accordingly, modified and new dispensers that support a regulated number of servings should be intuitive, thereby supporting more efficient consumer usage and acceptance.

Beverage dispensers, vending machines, and coolers allow for one user interaction at a time, including an end-to-end transaction from selection to delivery of the ordered product. Such beverage dispensers are often located in noisy venues, such as, food courts, arenas, restaurants, convenience stores, and grocery stores. User interfaces of dispensers and other beverage machines can be slow, especially given a total number of beverage choices for consumers and complexity of machines for service people and technicians. As such, there is a need to improve user interaction with dispensers, vending machines, and coolers to support consumer, service personnel, and technician usage.

BRIEF SUMMARY OF THE INVENTION

Dispenser machines or dispensers ("machines") that provide consumer consumable products, such as beverages, for use by consumers may be configured with respective wireless communication devices and readers with which a machine-readable medium may read. The machines may determine an available balance for a user from data that is delivered via the machine-readable medium. The machine-readable medium may include a variety of technologies such as radiofrequency identification (RFID) chips, conductive ink, magnetic stripes and/or RFID chips on cards, coupons, bus tickets, train tickets, credit cards, biometric data and many other available technologies used for storing and delivering data specific to an available balance for a specific user. In conditions where the available balance is sufficient for dispensing the beverage, the machine may dispense a controlled amount of the beverage such that unlimited dispensing is prevented. As a result, a machine may control the amount of dispensed beverage a user may access without increasing the available balance. Furthermore, the machine may also secure the machine-readable medium until dispensing of the beverage is complete, thus preventing the user from initiating the dispensing and then removing the machine-readable medium before an updated balance has been written. The machine may also read biometric parameters, such as finger prints, facial features, or vocal sounds, to verify that a same user is operating the machine for each beverage dispensing associated with the machine-readable medium. The controlling of the dispensed beverage may allow a venue to provide users with greater than one use per beverage vessel while preventing unlimited refilling of the beverage. The machine may also respond to voice commands from different types of users, such as customers, operators, and service technicians, where each type of user may use different libraries to perform different tasks (e.g., order beverage, validate user, check inventory, check operational status, etc.).

To avoid the shortcomings of the conventional system, one embodiment may include a machine for dispensing beverages. The machine may include a reader configured to read data representative of an available balance for a user to obtain beverages from the machine from a machine-readable medium and electronics. The electronics may be configured to receive the data from the machine-readable medium in response to the user positioning the machine-readable medium within reading distance of the reader, enable the user to dispense a beverage into a vessel, and update the available balance of the machine-readable medium that reduces or prevents the user from dispensing unlimited beverages.

One embodiment of a method for providing beverages may include reading, by a reader, data representative of an available balance for a user to obtain beverages from a machine-readable medium, the data may be read in response to the data being electromagnetically communicated from the machine-readable medium to the reader, such as by the user positioning the machine-readable medium within reading distance of the reader, enabling the user to dispense a beverage into a vessel, and updating the available balance of the machine-readable medium so as to reduce or prevent the user from dispensing unlimited beverages. In one embodiment, the user profile is temporary and does not include an identifier of a particular user, but rather associates the biometric parameter of the user with a vessel, such as a cup, identifier.

One embodiment may include a machine for providing beverages. The machine may include a reader configured to read data representative of an available balance and a machine-readable identifier for a user to obtain beverages from the machine from a machine-readable medium, a biometric sensor configured to read a biometric parameter, and electronics. The electronics may be configured to collect the biometric parameter, receive the data from the machine-readable medium, associate the biometric parameter with the machine-readable identifier to form a first pair. After a first dispensing, the electronics may determine whether a subsequent machine-readable identifier and subsequent biometric parameter that form a subsequent pair collected for a subsequent dispensing match the first pair. If the first and subsequent pair match, the electronics may enable the user to dispense a beverage into a vessel if an available balance exists, otherwise, the user is prevented from dispensing the beverage into the vessel. The available balance of the machine-readable medium may be updated so as to reduce or prevent the user from dispensing unlimited beverages.

One embodiment of a method for providing beverages may include reading, by a reader, data representative of an available balance and a machine-readable identifier for a user to obtain beverages from a machine-readable medium, the data being read in response to electromagnetically communicating the machine-readable medium with the reader, collecting a biometric parameter of the user, and associating the biometric parameter with the machine-readable identifier to form a first pair. After a first dispensing, determining whether a subsequent machine-readable identifier and subsequent biometric parameter that form a subsequent pair collected for a subsequent dispensing match the first pair. If the first and subsequent pair match, enabling the user to dispense a beverage into a vessel if an available balance exists, otherwise, preventing the user from dispensing the beverage into the vessel, and updating the data of the machine-readable medium so as to prevent the user from dispensing unlimited beverages.

One embodiment of a machine for providing beverages may include a biometric sensor configured to read a biometric parameter of a user and electronics. The electronics may collect the biometric parameter of the user via the biometric sensor, and create a user profile for the user. The biometric parameter may be associated with the user profile, and a user type may be assigned to the user profile.

One embodiment of a process for providing beverages may include receiving an auditory command from a user. The auditory command may be processed to create a machine-determinable command. A command confirmation signal may be communicated to the user, and the beverage may be dispensed into a vessel thereafter. In an embodiment, voice processing may be performed to confirm whether the user is the same user as previously used the vessel by correlation of the processed voice with a vessel identifier, thereby enabling a dispenser to limit quantity of consumed beverages and prevent fraud.

Additionally there may be multiple dispensers in an outlet. It is desirable to ensure the controlled pour process takes this into account so that a customer receives a beverage from one dispenser, for example using a cup with a bar code allowing a single dispense, then proceeding to another dispenser to dispense another drink.

BRIEF DESCRIPTION OF THE DRAWINGS

Illustrative embodiments of the present invention are described in detail below with reference to the attached drawing figures, which are incorporated by reference herein and wherein:

FIGS. 4A and 4B are illustrations of a beverage vending system inclusive of a machine that dispenses consumer products;

FIGS. 5A and 5B are illustrations of a beverage dispensing system for dispensing beverages;

FIG. 6 is an illustration of a point-of-sale (POS) system that supports the purchase of consumer products, such as beverages, and capable of communicating with consumer electronics;

FIG. 12 is an illustration of a schematic of electronics of a machine that is used for providing consumer products, such as beverages;

FIG. 13 is an illustration of a flow diagram of a process operable by a machine that regulates usage, such as number or quantity of beverages;

DETAILED DESCRIPTION OF THE INVENTION

Figure 1:
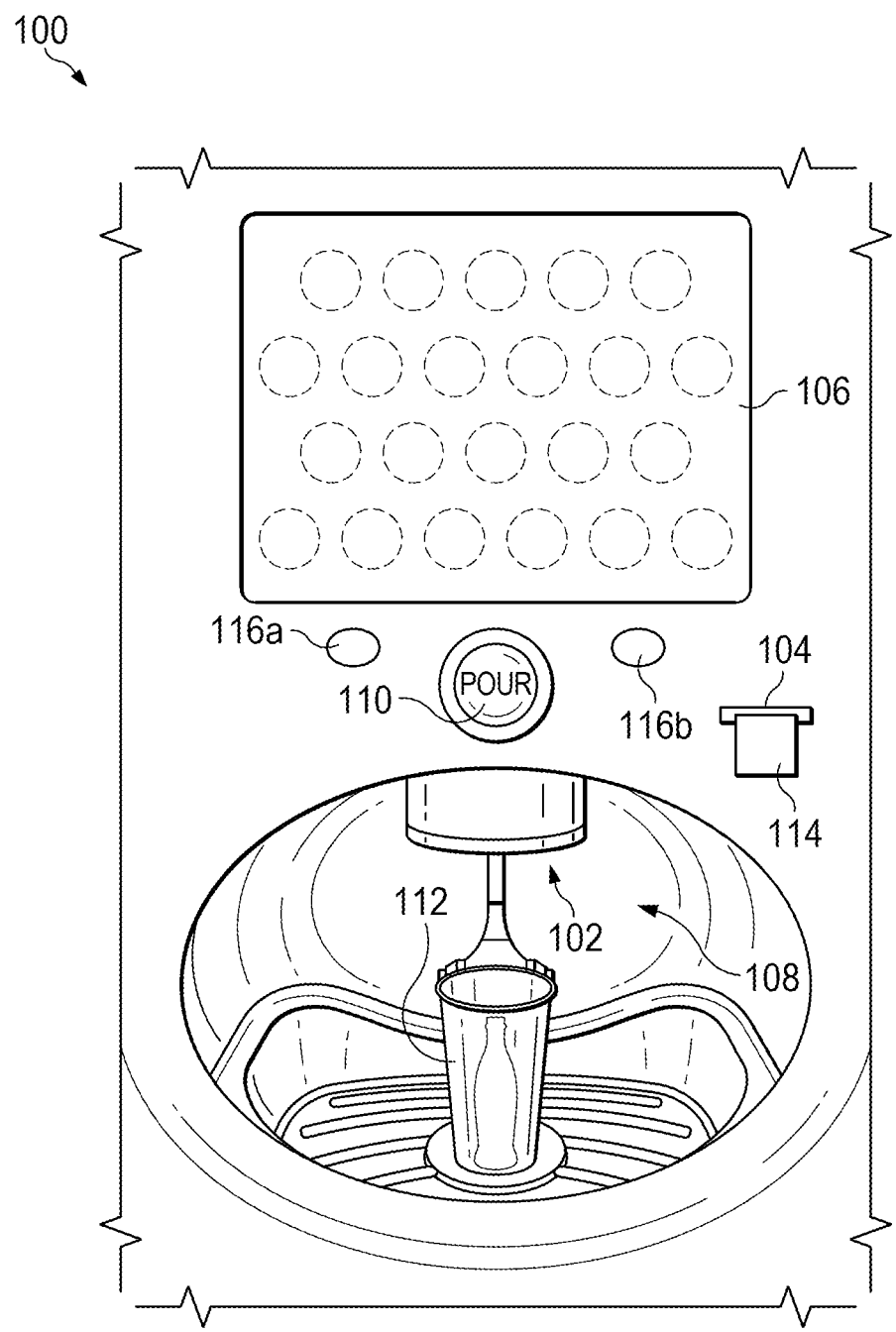
FIG. 1 is an illustration of a machine that dispenses consumer products, such as beverages.

With regard to FIG. 1, an illustration of a machine 100 that dispenses consumer products, such as beverages, to consumers is shown. The machine 100 may be a dispenser, but may alternatively be a cooler, vending machine, or any other machine configured to provide consumer products for consumers to purchase or otherwise obtain. In an embodiment, the beverages may be soft-drinks, fruit beverages, still beverages, water, and so on. The machine 100 may be placed in a venue such as, but not limited to, retail stores, grocery stores, restaurants, malls, sports venues, airports, walkways, or any other public or private location at which a consumer may purchase a consumer product, such as a beverage, from the machine 100.

In one embodiment, the machine 100 may include a dispenser 102, a reader 104 for reading machine-readable indicia, a user interface 106 with which a user may interface, a cavity in which the user may pour beverages, and a button 110 that may enable the user to start and stop pouring the beverage. A user may place a vessel 112 inside the cavity beneath a nozzle 108, and press the button 110 to pour a selected beverage via the user interface 106. A machine-readable medium ("MRM") 114 may be inserted into the reader 104 if configured as a slot, or otherwise placed on, in, or sufficiently close to the reader 104 if a non-slot configuration is utilized. The machine 100 may include at least one biometric sensor 116a, 116b (collectively 116) that may be configured to gather biometric data of the user. Biometric data may be referred to as biometric parameters. The machine 100 may also include electronics (see FIG. 12, for example) including a processor that is electronically communicative with the reader 104, the user interface 106, the biometric sensor 116, such as a camera or image sensor, and the button 110, so as to read/write to the machine-readable medium 114 and control operation of the machine 100.

The reader 104 may include any type of reader including, but not limited to, an electromagnetic reader. In an embodiment, the reader 104 may read data from the machine-readable medium 114 and communicate the data to the processor. The data may be representative of an available balance for the user to obtain beverages from the machine 100. To be consistent with rules or regulations, the data may set any initial balance or threshold rate of dispensing. The data may be loaded onto the machine-readable medium 114 at a point-of-sale location or any other location designated by the venue in which the machine 100 resides. The processor may then use the data to determine whether the available balance exists for the user to dispense the beverage. In a condition that the available balance is sufficient for dispensing the beverage, the processor may enable the dispenser 102 to dispense a beverage selected by the user, and deduct a beverage or volume of fluid dispenses, for example. One of ordinary skill in the art will appreciate that the processor may communicate to the dispenser 102 through various electronic connections as well as wireless communication networks. One of ordinary skill in the art will also appreciate that the processor may communicate a number of messages to the dispenser 102 that may allow the dispenser 102 to dispense the beverage into the vessel 112. The number of messages may include, but are not limited to, a specific amount of the beverage to be dispensed, a constant dispensing of the beverage up to a threshold so long as the user continues to press the button 110, and other similar dispensing control methods. In some embodiments, the processor may communicate a new available balance to the reader 104 to be written to the machine-readable medium 114.

The biometric sensor 116 may include any type of biometric sensor, including, but not limited to, a camera to perform facial recognition, microphone to perform voice recognition, and fingerprint reader to perform fingerprint analysis. Biometric data of the user may include image data (e.g., 2D and/or 3D image data) of a user captured by a camera. The biometric data may include raw data, processed data, and/or metadata derived from the raw data. One of skill in the art will appreciate that a number of methods may be used to obtain biometric data of the user. For example, an integrated front facing camera may capture an image of the user, a sound recording sensor may capture a voice clip of the user, or a fingerprint scanner may obtain a fingerprint in response to the user sliding or holding their finger to the fingerprint scanner. The biometric sensor 116, and/or others described herein, may be a front facing camera configured for facial recognition. Biometric sensor 212 of FIG. 2, and others described herein, may be depicted as a fingerprint scanner configured for obtaining fingerprints. Biometric sensor 314 of FIG. 3, and others described herein, may be a microphone configured for sensing or capturing voice signals (e.g., voice commands) from users of the dispenser 102. One of skill in the art will appreciate that biometric sensors as described herein may include any known or future developed biometric sensor.

In one embodiment, the machine 100 may include two or more biometric sensors 116a, 116b. The two or more biometric sensors 116a, 116b may be cameras or image sensors and may be configured to synchronize so that a three-dimensional image of the user is obtained. In other embodiments, a single biometric sensor 116 may obtain a two-dimensional image of the user. In yet other embodiments, such as biometric sensor 310 of FIG. 3, the biometric sensor 310 may include a display screen that may be configured to give a visual representation of an image being scanned by the biometric sensor 310, such as, but not limited to, an image of the user. One of skill in the art will appreciate that any of the embodiments of a biometric sensor described herein may be interchangeable and equally represented by the specific embodiment depicted.

The dispenser 102 may associate gathered biometric data of a first user with a user profile in response to the first user accessing the dispenser 102 with the machine-readable medium 114 a first time of use. In one embodiment, the user profile may be further associated with the machine-readable medium 114. The user profile may not identify a specific individual, but rather use a biometric identifier of a user and associate other information, such as a vessel identifier, machine usage history, etc., with that biometric identifier. The user profile may be stored in a data repository of other user profiles of a machine or in a central location (e.g., on the cloud). The dispenser 102 may compare future gathered biometric data of a future user associated with the machine-readable medium 114 with the gathered biometric data of the first user to verify that the future user attempting to access the dispenser 102 with the machine-readable medium 114 is the first user (e.g., the same user who used a cup with the machine-readable medium 114). In response to verifying that the future user and the first user are a same user, the dispenser 102 may allow dispensing of the consumer product. Alternatively, in response to failing to verify that the future user and the first user are the same user, the dispenser 102 may provide a notification to the future user and prevent dispensing of the consumer product. By preventing dispensing, fraudulent usage of the dispenser 102 may be prevented. And, by verifying the same user, the dispenser 102 may monitor a user and regulate dispensing amounts of beverage to comply with local regulations.

The dispenser 102 represents any of a variety of beverage dispensers such as, but not limited to, those discussed hereinabove. Generally, the dispenser 102 may be connected to a pump control (not shown). The pump control may serve as an intermediary between the processor and the dispenser 102. In other embodiments, the dispenser 102 may be connected to a valve with a switch. The switch may be configured to be toggled in response to the user placing the machine-readable medium 114 within reading distance of the reader 104. The toggled switch may then allow the valve to open and the beverage may begin to dispense. One of ordinary skill in the art will appreciate that there are a variety of ways to control the dispenser 102. For example, a retrofitted machine may be formed by the dispenser 102 or a conventional dispenser, such as a one, two, six, eight or 12 nozzle dispenser, and the switch and the valve may be to allow for controlled dispensing of the beverage by reading and writing to a machine-readable medium 114 of respective users. In another embodiment, for example, the reader 104 may be originally built into the machine 100.

The reader 104 may be any of a variety of active or passive sensors. Active sensors may be used in a condition that the machine-readable medium 114 is an active component. Similarly, passive sensors may be used in a condition that the machine-readable medium 114 includes passive components. One of ordinary skill in the art will appreciate that both active and passive sensors, as well as active and passive components, may accomplish the same or similar function of electromagnetically communicating between the reader 104 and the machine-readable medium 114. In some embodiments, the reader 104 may be mounted on machine 100. In other embodiments, the reader 104 may be external to the machine 100 and electrically coupled to the machine 100 by a cable or wireless communicative channel. Additionally, the reader 104 may be configured to be mounted in a variety of locations on the machine 100. For example, in some embodiments, such as those described in reference to FIGS. 1, 4A, and 5A, the reader 104 may be built-in to a user facing surface in a position that is convenient for the user to insert the machine-readable medium 114 into the reader 104. In other embodiments, for example, such as those described in reference to FIGS. 2 and 3, the reader 104 may be configured to sense the machine-readable medium 114 as the medium 114 passes under the nozzle 108, such as the medium 114 being coupled to the vessel 112. The reader 104 may be located at a front edge (e.g. bottom front edge) of the cavity.

The user interface 106 may be any device used for communicating between the user and the machine 100. In one embodiment, the user interface 106 may include a display for displaying messages from the machine 100 to the user. In FIG. 1, the user interface 106 is configured to display a message in French (translated to English, "You have reached your limit please, buy another beverage") as an illustration of a message to the user. In some embodiments, the display may be a touchscreen display, and may be used to receive input commands from the user. Additionally and/or alternatively, the user interface 106 may include any of a screen, mouse, built-in keyboard, external keyboard, soft-keyboard, remote control, buttons, and/or any other device that a user may employ to interact with the machine 100. One of ordinary skill in the art will appreciate that the user interface 106 may be any of the hereinabove described technologies as well as any other user interface technology. In some embodiments, the reader 104 is part of the user interface 106. For example, the user interface 106 and the reader 104 may be part of a mobile application on a mobile device. Alternative embodiments of the machine 100, the reader 104, the user interface 106, and the machine-readable medium 114 are described in further detail hereinbelow with reference to FIGS. 2-14.

In some embodiments, the machine 100 may be a retrofitted beverage dispenser (also referred to as a legacy system). The retrofitted beverage dispenser may experience limited electrical and mechanical modification. The reader 104 and machine-readable medium 114 may be implemented external to the retrofitted beverage dispenser.

The machine 100 may be located in a variety of locations in the venue. In some embodiments, the machine 100 may be located behind a service counter, where an employee of the venue interacts with machine 100 on behalf of the user. In some embodiments, the machine 100 may be configured to provide free samples, at a substantially low volume, to the user. In some embodiments, the user may purchase the machine-readable medium 114 from the venue and the machine-readable medium 114 is a read/write device. In other embodiments, the machine-readable medium 114 may be a medium already owned by the user such as, but not limited to, a train ticket. The machine-readable medium 114 may be used on a multitude of machines that operate substantially similar to the machine 100. Additionally, control of the machine-readable medium 114 may be performed over a network, such as the Internet, in a "cloud" configuration.

The cloud may be any network, device, or combination of devices configured to provide data to the user. The cloud may include storage devices that store content requested by users at the machine 100. The cloud may include any variety of routers, servers, bridges, switches, and combinations of such devices that provide connectivity between the machine 100, storage devices, and other machines (e.g. dispensers).

The vessel 112 may be any beverage container, such as, but not limited to, cups, glasses, thermoses, mugs, bottles, and any other device that holds a beverage for a user to drink. The vessel 112 may include any shape, size, or volume. If the machine is configured to dispense other consumable items, such as foodstuffs, alternative vessel configurations may be utilized. In one embodiment, the vessel 112 may include a readable attribute that may be configured to be read by the machine to verify that the vessel 112 is a vessel belonging to the vendor. The readable attribute may include, but is not limited to, a special color, an identification on an exterior portion of the vessel 112, a vendor logo, a unique picture, or any other attribute that may be read by the machine.

Figure 2:
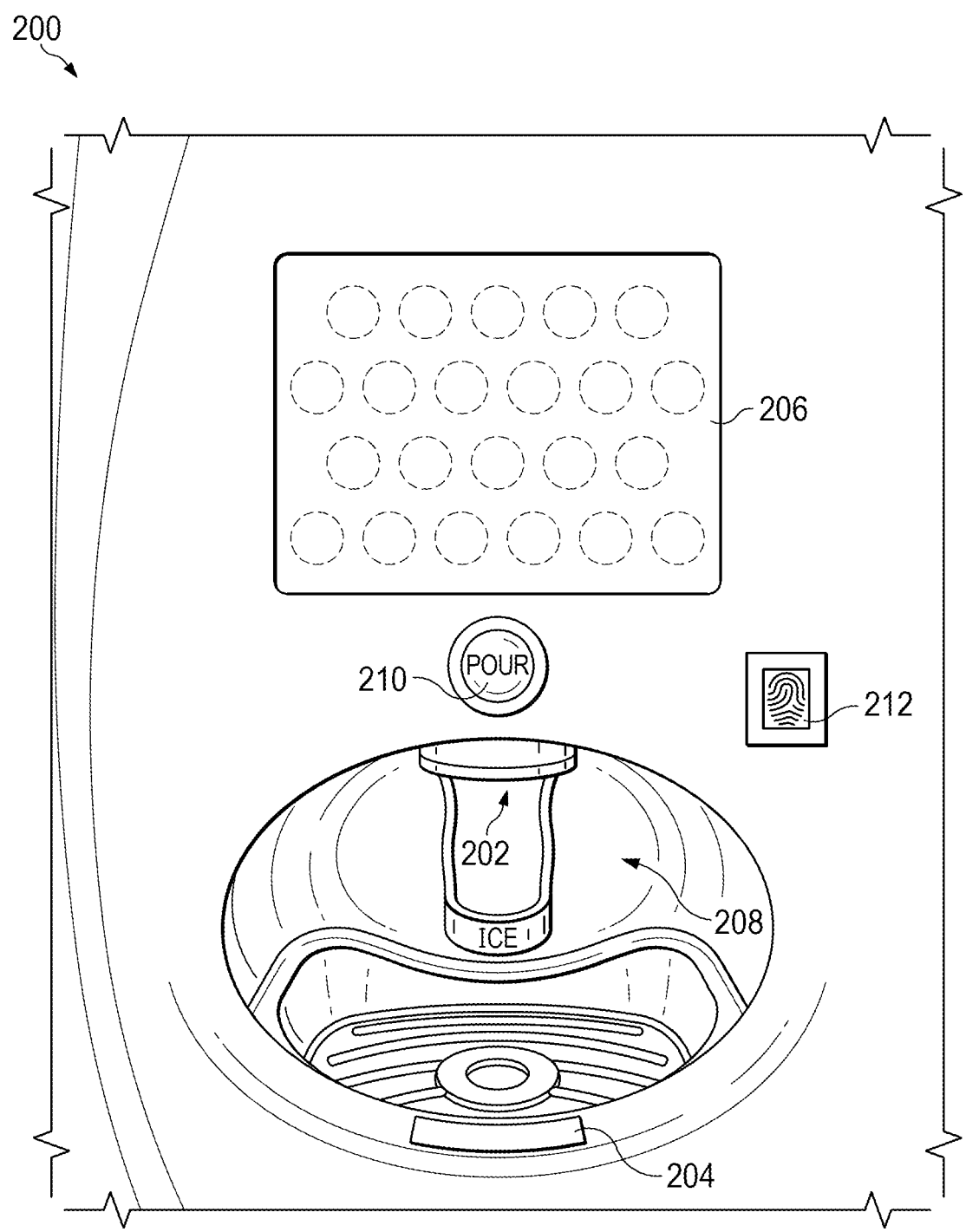
FIG. 2 is an illustration of a machine that dispenses consumer products.

With regard to FIG. 2, an illustration of a machine 200 that provides consumer products, such as beverages, to consumers is shown. In some embodiments, machine 200 may include a dispenser nozzle 202, a reader 204, a user interface 206, a cavity 208, a button 210, and a biometric sensor 212. The machine 200 may represent an alternative embodiment of the machine 100 of FIG. 1. The reader 204 may be configured to detect a machine-readable medium as it enters the cavity 208. In one embodiment, the machine-readable medium may be coupled to a vessel, such as a cup, as further described herein. As the vessel passes an opening on a user facing side of the machine 200, the machine-readable medium may pass a field detectable by the reader 204. The opening may define an edge of the cavity 208. Once the vessel is inside the cavity 208, the user may set the vessel on a platform or base, or simply hold, within the cavity 208, and initiate dispensing of a selected beverage via the user interface 206 and button 210, for example.

The reader 204 may be configured to be out of sight and substantially on the edge of the cavity 208 defined by the opening. In one embodiment, the reader 204 may be electronically communicative with electronics internal to machine 200. In one embodiment, the reader 204 may be positioned anywhere along the edge of the opening of the cavity 208. In another embodiment, the reader 204 may be positioned at any location substantially close to the dispenser nozzle 202. In other embodiments, the reader 204 may either be on an external portion of the edge or internal to the edge and visibly shielded.

More specifically, as the user passes the vessel into the cavity 208, the reader 204 may identify the machine-readable medium that is coupled to the vessel. The reader 204 may communicate data from the machine readable medium to the electronics of the machine 200. The electronics of the machine 200 may determine if an available balance exists that is sufficient for the user to obtain a beverage or at least a portion thereof. In a condition that the available balance is sufficient, the electronics may communicate to the dispenser nozzle 202 to dispense the beverage in response to the user pressing the button 210. The user may interact with the user interface 206 to identify a specific beverage to be dispensed. In one embodiment, the user interface 206 may also communicate a status to the user. The status may be any variety of messages, such as, but not limited to, that the available balance is insufficient to dispense a full beverage, that the beverage is currently being dispensed, that a particular beverage has run out, that the user has reached a threshold of dispensed beverage that defines a limit of an amount of dispensed beverage permitted per interaction, and/or any other message that is appropriate between the machine 200 and the user who is attempting to obtain the beverage.

In one embodiment, the electronics of the machine 200 may be configured to collect a biometric parameter of the user via the biometric sensor 212, receive data from a machine-readable medium in response to the machine-readable medium being in communication distance of the reader 204, associate the biometric parameter with the machine-readable identifier to form a biometric identifier and machine-readable identifier pair. After a first dispensing, the electronics of the machine 200 may be configured to determine whether the machine-readable identifier and biometric parameter collected for subsequent dispensings match the machine-readable identifier and biometric parameter pair. If the pair match, the electronics of the machine 200 may be further configured to enable the user to dispense a beverage into a vessel if an available balance exists.

Figure 3:
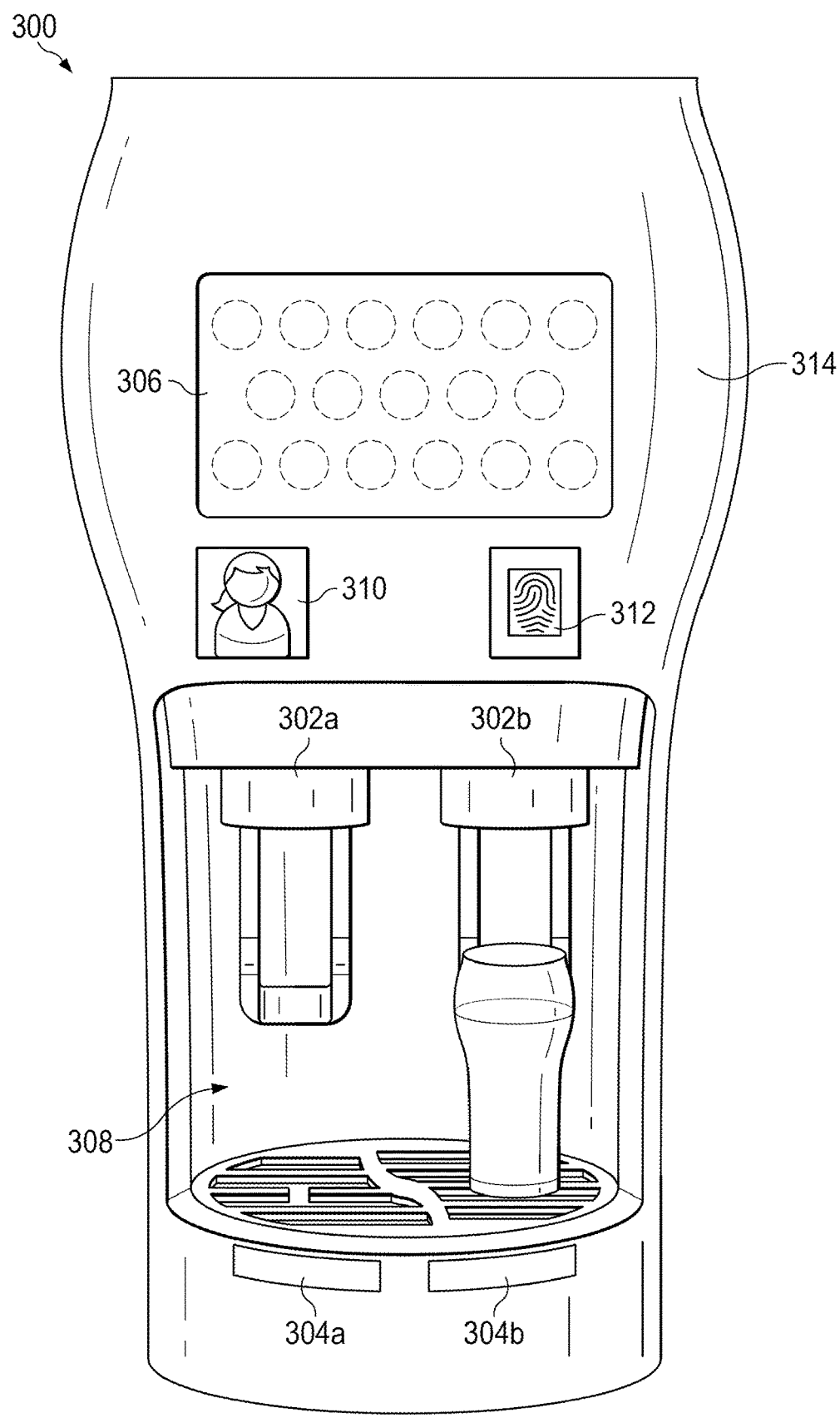
FIG. 3 is an illustration of a machine that dispenses consumer products.

With regard to FIG. 3, an illustration of a machine 300 that provides consumer products, such as beverages, to consumers is shown. In some embodiments, machine 300 may include at least two dispenser nozzles 302a and 302b (collectively 302), at least one reader 304a and 304b (collectively 304), a user interface 306, and at least one cavity 308. In one embodiment, the machine 300 may include at least two (in this case three) biometric sensors 310, 312, and 314 to provide redundancy, optional, or multiple biometric parameters in verifying consumer identity. In other embodiments, nozzle 302a may be configured to dispense ice and not beverages. The machine 300 may represent an alternative embodiment of the machine 100 of FIG. 1. The reader(s) 304 may be configured to detect a machine-readable medium, such as a machine-readable medium coupled to a vessel, as the machine-readable medium enters the cavity(s) 308. As the vessel passes an opening on a user-facing side of the machine 300, the machine-readable medium may pass a field detectable by the reader(s) 304.

In one embodiment, the reader(s) 304 may be configured to be associated with a same number of dispenser nozzles 302. As the vessel passes one of the readers, electronics internal to the machine 300 may operate the respective dispenser nozzle 302 and prevent the other dispenser nozzles from dispensing a beverage unless another machine-readable medium with an available balance is detected by another reader. In another embodiment, passing any of the readers 304 may allow the user to operate any of the dispenser nozzles 302. The readers 304 and dispenser nozzles 302 may be housed in the cavity 308. In another embodiment, sets of readers 304 and dispenser nozzles 302 may be housed in respective cavities 308. If more than one of the readers 304 happen to read the machine-readable medium, a process may determine which reader received a stronger signal (e.g., RSSI), and assume that reader receiving the stronger signal is the reader the user intended to be selected. Determining a correct reader by signal strength may assist in preventing dispensing beverages from an incorrect dispenser associated with a reader that received a weaker signal (e.g., RSSI). In an embodiment, an indicator, such as an illumination device, that is associated with the determined reader/nozzle may notify the user which of the dispenser nozzles 302 the use is to use for dispensing a beverage.

In one embodiment of a use of the machine 300, the user may approach the machine 300 with the vessel. As the user passes the vessel into the cavity 308, a first reader of the at least one reader 304 may identify the machine-readable medium that is coupled to the vessel. The first reader may communicate data from the machine-readable medium to the electronics of the machine 300. The electronics of the machine 300 may determine if an available balance exists that is sufficient for the user to obtain the beverage.

In a condition that the available balance is sufficient, the electronics may cause a selected beverage to be dispensed from a dispenser nozzle that positionally corresponds with the first reader. The user may further interact with the user interface 306 to select a specific beverage to be dispensed. In one embodiment, the user interface 306 may also communicate a status to the user.

With regard to FIGS. 4A and 4B, illustrations of a beverage vending system 400 inclusive of machines 402a and 402b (collectively 402) that vend consumer products, such as beverages, to consumers are shown. The machines 402 may represent an alternative embodiment of the machine 100 of FIG. 1. The machines 402 may be new and have an reader integrated therein or be a retrofitted beverage vending machine with an added reader.

In one embodiment, the machine 402a may include a mounted reader 404, a first mounted biometric sensor 412 (e.g., camera with an optional electronic display for user alignment), and a second mounted biometric sensor 416 (e.g., microphone). The mounted reader 404 may be installed on the machine 402a and configured to read a machine-readable medium. The first and second mounted biometric sensors 412 and 416 may be installed on the machine 402a and configured to obtain biometric data of the consumer. In an embodiment, a processor (not shown) operating in the machine 402a may be configured to communicate with the mounted reader 404. In another embodiment, the processor may be internal to the mounted reader 404. In yet another embodiment, the processor may be internal to the first mounted biometric sensor 412.

In another embodiment, the machine 402b may be electronically communicative with an external reader 406 for reading a machine-readable indicia (e.g., RFID reader), a first external biometric sensor 414 (e.g., fingerprint reader), and a second external biometric sensor 418 (e.g., microphone). The electronic communication may include at least three cables 408a, 408b, and 408c (collectively 408) that are physically and electrically connected to the machine 402b on respective first ends and the external reader 406, the first external biometric sensor 414, and the second biometric sensor 418 on respective second ends opposite the first ends. In another embodiment, the electronic communication may include a wireless network communication. The first and second mounted biometric sensors 412 and 416 are shown to be mounted to the machine 402a with the mounted reader 404 and the first and second external biometric sensors 414 and 418 are shown to be electronically communicative with the machine 402b that is electronically communicative with the external reader 406. One of skill in the art will appreciate that combinations of external and mounted components are interchangeable (e.g. an external reader and a mounted biometric sensor; a mounted reader and an external biometric sensor).

Retrofitting the machines 402a and/or 402b may provide a solution to updating beverage vending machines that are currently in use or in production. Presenting a consistent approach to the user may allow venues to accommodate machine-readable mediums and control dispensing of the beverage. In one embodiment, the machines 402 may be vending machines and the amount of beverage dispensed per transaction may be measured in bottles or cans instead of volume or vessels. In another embodiment, the amount of beverage dispensed per transaction may be measured by time, calories, sugar, or any other measurable parameter of the beverage.

In one embodiment of a use of the machines 402, the user may place a machine-readable medium within reading distance of either of the readers 404, 406. The readers 404, 406 may communicate data from the machine-readable medium to a processor operating in the respective machine 402a or 402b. The biometric sensors 412, 414, 416, and 418 may communicate biometric data of the user to the processor. The processer may determine if the user is a correct or same user associated with the machine-readable medium, and if an available balance exists that is sufficient for the user to obtain the beverage. In a condition that the available balance is sufficient and the user is the correct user, the processor may cause the machine 402a or 402b to dispense a selected beverage in response to the user pressing a button corresponding to a specific beverage. In a condition that the available balance is insufficient, a message may be displayed on a user interface mounted to the respective machine 402a or 402b and/or another notification signal, such as an audible notification, may be generated to alert the user of the insufficiency.

With regard to FIGS. 5A and 5B, illustrations of a beverage dispensing system 500 inclusive of a machine 502a and 502b (collectively 502) that provides consumer products, such as beverages, to consumers are shown. The machines 502 represents an alternative embodiment of the beverage dispenser machine 100 of FIG. 1 that includes a retrofitted beverage dispensing machine.

In one embodiment, the machine 502a may include a mounted reader 504, a first mounted biometric sensor 512 (e.g., camera with optional electronic display), and a second mounted biometric sensor 516 (e.g., microphone). The mounted reader 504 may be installed on the machine 502a and be configured to read a machine-readable medium. The first and second mounted biometric sensors 512 and 516 may be installed on the machine 502a and configured to obtain biometric data of the consumer. In one embodiment, a processor may be installed into the machine 502a, and may be configured to communicate with the mounted reader 504. In another embodiment, the processor or another processor may be internal to the mounted reader 504. In yet another embodiment, the processor may be internal to the mounted biometric sensor 512.

In one embodiment, the machine 502b may be electronically communicative with an external reader 506, a first external biometric sensor 514 (e.g., fingerprint reader), and a second external biometric sensor 518 (e.g., microphone). The electronic communication may include at least three cables 508a, 508b, and 508c (collectively 508) that are physically and electrically connected to the machine 502b on respective first ends and the external reader 506, the first external biometric sensor 514, and the second external biometric sensor 518 on respective second ends opposite the first ends. In another embodiment, the electronic communication may be a wireless network communication. The first and second mounted biometric sensors 512 and 516 are shown to be mounted to the machine 502a with the mounted reader 504 and the first and second external biometric sensors 514 and 518 are shown to be electronically communicative with the machine 502b that is electronically communicative with the external reader 506. One of skill in the art will appreciate that combinations of external and mounted components are interchangeable (e.g. an external reader and a mounted biometric sensor; a mounted reader and an external biometric sensor).

Retrofitting the machines 502a and/or 502b may provide a solution to updating beverage dispensing machines that are currently in use or in production. Presenting a consistent user interface and experience may allow venues to accommodate machine-readable mediums and control dispensing of the beverage. In one embodiment, the machines 502 may be a dispenser, and the amount of beverage dispensed per transaction may be measured by a sensor positioned substantially near dispensing nozzles associated with various beverage brands.

In one embodiment of a use of the machines 502, the user may approach the machines 502 with the machine-readable medium and a vessel (e.g., cup). The user may place the machine-readable medium within reading distance of one of the readers 504, 506. The readers 504, 506 may communicate data from the machine-readable medium to the processor. The biometric sensors 512, 514, 516, and 518 may communicate biometric data of the user to the processor. The processer may determine if the user is a correct user associated with the machine-readable medium and if an available balance exists that is sufficient for the user to obtain the beverage. As an example, the processor may identify a user for a first usage of the vessel and confirm the same user using the vessel each machine usage thereof. If it is determined that the available balance is sufficient and the user is the correct user, the processor may communicate to the machines 502 to dispense the beverage in response to the user pressing a lever or other pour mechanism corresponding to a specific beverage and associated nozzle.

In one embodiment, the processor may toggle a switch that controls a valve that enables pouring of the beverage. The processor may further toggle the switch back after a threshold volume of beverage is dispensed. If a determination is made that the available balance is insufficient, the processor may prevent dispensing of a beverage, such that the user pressing the lever does not initiate dispensing of the beverage. The processor may write data back to the machine-readable medium, where the data may include volume poured and/or a number of bottles or cans dispensed. As a result, varying amounts of the beverage may be dispensed without "charging" the user with a full beverage (e.g., dispensing half of a glass at one instance and the remaining half of the glass at a later instance, as opposed to a whole glass or amount of beverage). In writing back the data to the machine-readable medium, the data may be written back on a periodic or aperiodic basis while the user is pouring the beverage. In other words, the data may be written back in real-time as a beverage is being poured (e.g., based on volume), thereby more accurately writing portions of beverages onto the machine-readable medium (e.g., 3 oz. . . . 4 oz. . . . 5 oz. . . . etc.).

With regard to FIG. 6, an illustration of a point-of-sale (POS) system 600 that supports purchases of products, such as beverages, to consumers is shown. The POS system 600 may include a point-of-sale (POS) device 602 and machine-readable mediums and/or wireless communications devices 604a-604d (collectively 604).

The point-of-sale device 602 may be any device configured to receive payment for a product or service, and capable of increasing an available balance for dispensing a beverage. For example, in one embodiment, the point-of-sale device 602 may be a cash register. The point-of-sale device 602 may be communicative with the cloud. Via the cloud, the point-of-sale device 602 may be configured to be part of a network of point-of-sale devices that may be located in various venues (e.g., one or more retailers, such as a restaurant chain or in a food court). In an embodiment, the point-of-sale device 602 may communicate with a card reader/writer, and, in response to a user purchasing a beverage or certain number of beverages, the user or point-of-sale operator may insert a card or ticket with a machine-readable medium to write or increase a balance for pouring beverages by a beverage dispenser. In another embodiment, the point-of-sale device 602 may communicate user data with the cloud to determine available balance of the beverage. The point-of-sale device 602 may be alternatively configured to receive payment and communicate an increase in available balance to the machine-readable medium 604 (e.g., wirelessly).

In an embodiment, the user may purchase at least one beverage at the point-of-sale device 602. The user may pay for the beverage with any of a variety of payment methods, such as, but not limited to, cash, credit card, debit card, check, automated payment systems, coupons, mobile device payment systems, payment applications, or any other method of payment. In one embodiment, the user may have the machine-readable medium 604 in his or her possession for use at the point-of-sale device 602. In another embodiment, the user may obtain the machine-readable medium 604 at the point-of-sale device 602. One of ordinary skill in the art will appreciate that any method of paying for and obtaining a product may be used in the POS system 600. In an embodiment, the point-of-sale device 602 may be an automated machine operated by a consumer.

In the case of the machine-readable medium 604c disposed on the vessel 606, a number of credits may be disposed thereon, so purchase of the vessel 606 may not need additional reading or writing at the POS system 600. Alternatively, to prevent theft, the machine-readable medium 606c may require writing after purchase. A variety of configurations and mediums may be used.

In an embodiment, a biometric sensor 608 may obtain biometric data of the user at the point-of-sale device 602. The point-of-sale device 608 may be configured to associate the biometric data of the user with the machine-readable medium 604 and/or with a user profile locally or remotely, for example, in the cloud. Machines may have access to the user profile and may verify user identity with the biometric data of the user obtained at the point-of-sale device 602.

Figure 7D:
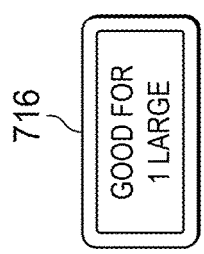
FIGS. 7A-7D are illustrations of a beverage dispenser along with items including machine-readable indicia usable with the dispenser to regulate dispensing.
Figure 7B:
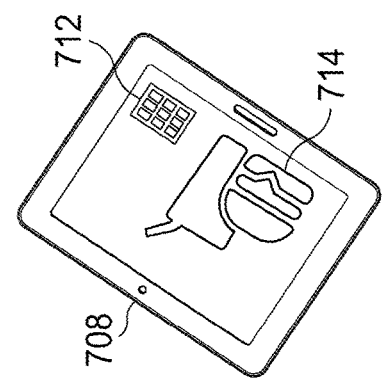
Figure 7C:
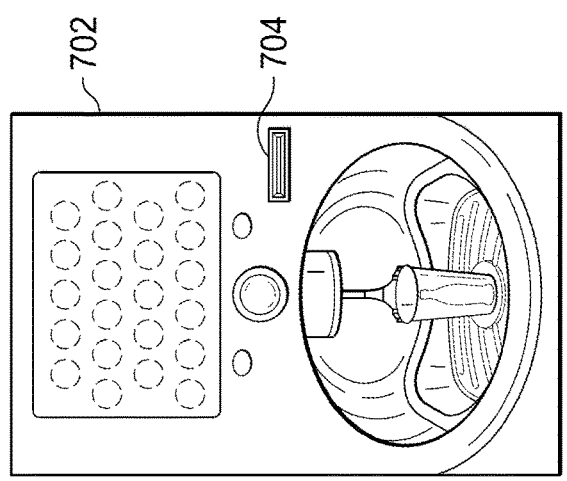
Figure 7A:
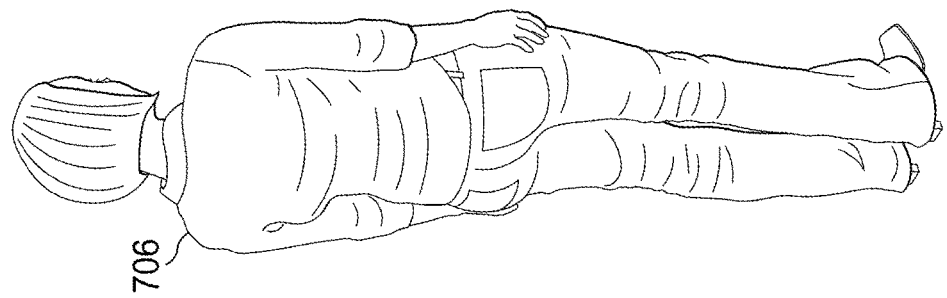
Figure 8:
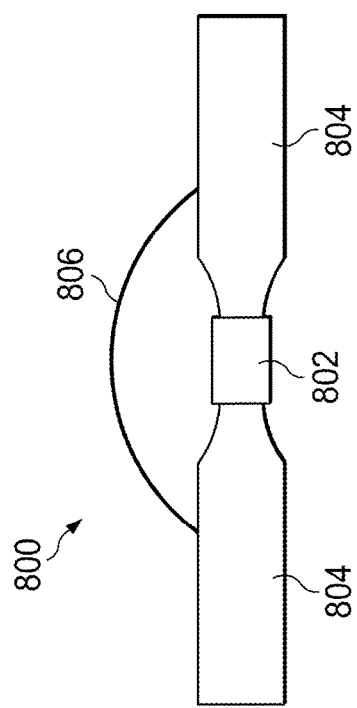
FIG. 8 is an illustration of a machine-readable medium that may be applied onto objects, such as cups, that is used in purchasing consumer products, such as beverages.

With regard to FIG. 7A, an illustration of a beverage dispenser 700 that provides consumer products, such as beverages, to consumers is shown. The beverage dispenser 700 may include a machine 702 having a reader 704 that may be accessible to a user 706. The user 706 may approach the machine 702 with a purpose of purchasing a beverage. Prior to approaching the machine 702, the user 706 may have acquired a machine-readable medium for use with the machine 702. In one embodiment, the user 706 may acquire the machine-readable medium at a point-of-sale device, such as a point-of-sale device 602 of FIG. 6. After acquiring the machine-readable medium at the point-of-sale device 602, the user 706 may receive the machine-readable medium, and may proceed to the machine 702. In another embodiment, the user 706 may utilize another device, such as a train ticket, as the machine-readable medium, and the machine 702 may be configured to read/write to that device.

With regard to FIGS. 7B-7D, illustrations of machine-readable mediums that may be used in purchasing consumer products, such as beverages, by consumers are shown. In one embodiment, the machine-readable medium may include a card 708 that is configured to be inserted into the reader 704. The user 706 may purchase the card 708 (e.g., amusement park ticket) at a point-of-sale device prior to approaching the machine 702. In another embodiment, the user may already own the card 708, and the machine 702 may be configured to utilize a balance on the card 708. The card 708 may include a unique identifier, such as a ticket number, that may be written onto an electromagnetic stripe 710, a radiofrequency identification (RFID) chip 712, or any other electromagnetic medium usable with a card payment device. The reader 704 may be configured to read the unique identifiers. In reading the unique identifiers, the reader 704 may obtain data representative of an available balance for the user 706 to obtain beverages from the machine 702. The machine 702 may also be configured to write a new balance, using the reader 704, to the machine-readable medium. In one embodiment, where the machine-readable medium is the card 708, the reader 704 may be a card reader.

In some embodiments, the card 708 may include graphics 714. The graphics 714 may include advertising material of the venue. Additionally, the graphics 714 may include any of a variety of visual graphics such as, but not limited to, advertising material for a beverage, advertising material provided by, and potentially paid for by, a third party, identification graphics of the venue, graphics unique to the user 706, advertising material for a card provider, or any other suitable card graphic. One of ordinary skill in the art will appreciate that a surface of the card 708 may be used to provide any of a variety of graphics 714 and that any visual graphic may not affect the functionality of the card 708.

In one embodiment, the card 708 may include a credit card associated with the user 706. The machine 702 may identify a credit card identifier and deduct a unit each time a beverage is poured. A time limit may also be established during which the user may pour beverages using any of the machine-readable medium options.

In another embodiment, the machine-readable medium may include a coupon 716. The coupon 716 may be configured to be associated with just one beverage or may be configured to be associated with more than just one beverage depending on a number of fuses within the coupon 716. For example, in one embodiment, the reader 704 may produce a signal strength at a threshold sufficient to blow a fuse in the coupon 716. The reader 704 may be configured to communicate to the machine 702 to dispense the beverage only in a condition that the coupon 716 includes an intact fuse. After the dispensing of the beverage and blowing the fuse in the coupon 716, the coupon 716 may not be utilized for further dispensing of the beverage. For example, in another embodiment, the coupon 716 may experience multiple blown fuses by the reader 704.

One of ordinary skill in the art will appreciate that FIGS. 7A-7D represent a portion of potential machine-readable medium options. One of ordinary skill in the art will also appreciate that any method of using a machine-readable medium to purchase a consumer product may be implemented in the machine 702 and may not be seen as modifying the beverage dispenser 700 as described herein.

With regard to FIGS. 8-11, illustrations of embodiments of a machine-readable medium that are used in purchasing consumer products, such as beverages, by consumers are shown. With regard to FIG. 8, an illustration of a machine-readable medium 800 inclusive of (i) a chip 802 coupled to an adhesive strap 804 and (ii) an antenna 806 coupled to the strap 804 that is used in purchasing consumer products, such as beverages, by consumers is shown. The machine-readable medium 800 may be coupled to a vessel. In one embodiment, the machine-readable medium 800 is disposed on a bottom surface of the vessel. The machine-readable medium 800, however, may be disposed onto any visible or nonvisible portion (e.g. between a material that forms a bottom surface) of the vessel, such that a reader may identify, read from, and write to the machine-readable medium 800. The reader may be configured to output an electromagnetic energy. In one embodiment, the electromagnetic energy may be above a threshold to cause an electronic device, such as the chip 802, a fuse, or other electronic component, on or in an electrical path with the machine-readable medium 800 to break causing the machine-readable medium 800 to no longer be used for dispensing beverages.

The machine-readable medium 800 may be any of a variety of intelligent labels, such as, but not limited to, RFID inlays, ultrahigh frequency RFID inlays, high-frequency inlays, near field communication inlays, or any other machine-readable medium. An example of a provider of intelligent labels may be Avery Dennison. In one embodiment, the chip 802 may include an integrated circuit. The chip 802 may also be a read/write chip. The data may include a count, volume, date/time, and/or other information to control beverage fills and refills (e.g., number of refills in an hour). One of ordinary skill in the art will appreciate that many solutions exist for storing, reading, and writing data to a chip that may be disposed on a consumer product. Any such solution may be reasonably implemented as a machine-readable medium in the disclosed embodiments, as described herein.

Figure 9:
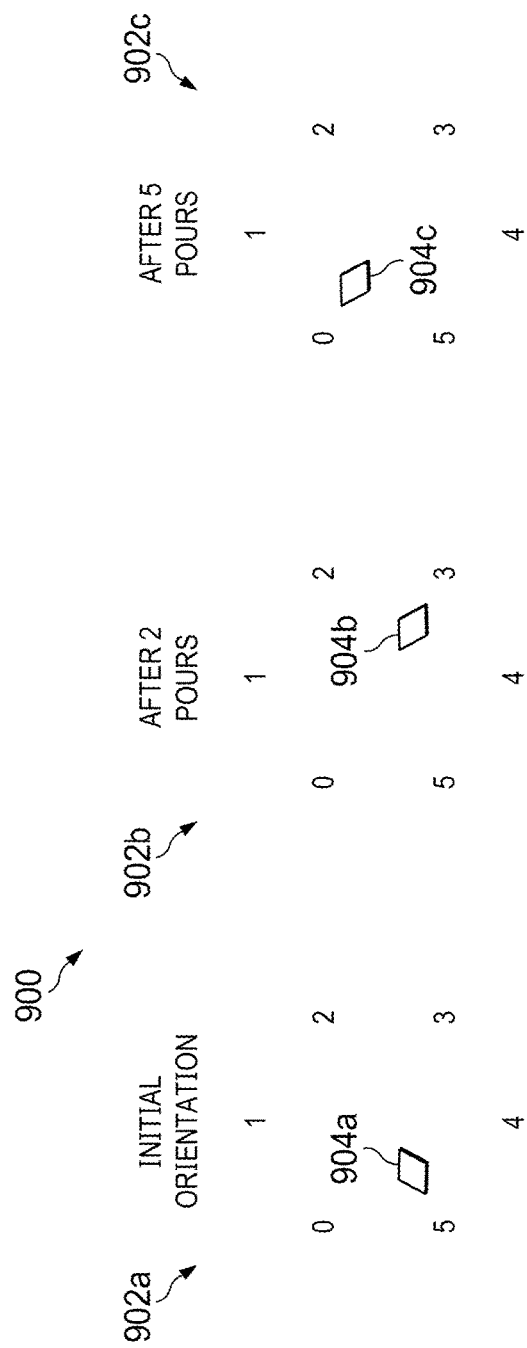
FIG. 9 is an illustration of a conductive ink system used in purchasing consumer products, such as beverages.

With regard to FIG. 9, an illustration of a conductive ink system 900 used in purchasing consumer products, such as beverages, by consumers is shown. The conductive ink system 900 may include conductive ink counters 902a-902c (collectively 902). The conductive ink counter 902 may include configurations of conductive ink 904a-904c (collectively 904). Numbers zero through five are shown as an illustration of how the various configurations of the conductive ink 904 may represent an available beverage balance. However, the numbers may or may not be seen in application of the conductive ink system 900. For example, the conductive ink 904 may be configured to be disposed on a vessel. However, the numbers would not appear on the vessel. A reader of a machine configured to dispense beverages may be configured to identify the available balance by the configuration of the conductive ink 904 (e.g. by reading the orientation of electrons within the ink) without requiring a visual representation of the numbers.

In a first state, the conductive ink counter 902a may be configured such that the electromagnetic orientation of the conductive ink 904a indicates that five beverages may be dispensed. In a second state, a user may have dispensed two beverages, and the conductive ink counter 902b may be configured such that the conductive ink 904b indicates that three beverages may be dispensed. In a third state, a user may have dispensed the remaining three beverages, and the conductive ink counter 902c may be configured such that the conductive ink 904c indicates that no beverages may be dispensed and that the available balance is now zero. The conductive ink 904 may be further configured to indicate a volume decrement according to a maximum volume allocated. Continuous decrement during a pour may be concurrently written to the conductive ink 904 such that at any time a pour is stopped an amount remaining may be indicated by the conductive ink 904.

Figure 10B:
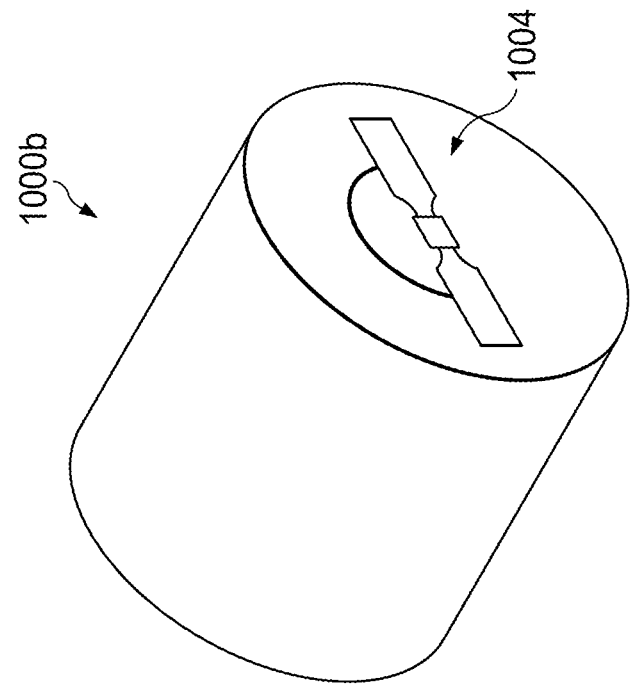
FIGS. 10A and 10B are illustrations of a vessel onto which a machine-readable medium is attached and usable by a user in purchasing consumer products, such as beverages.
Figure 10A:
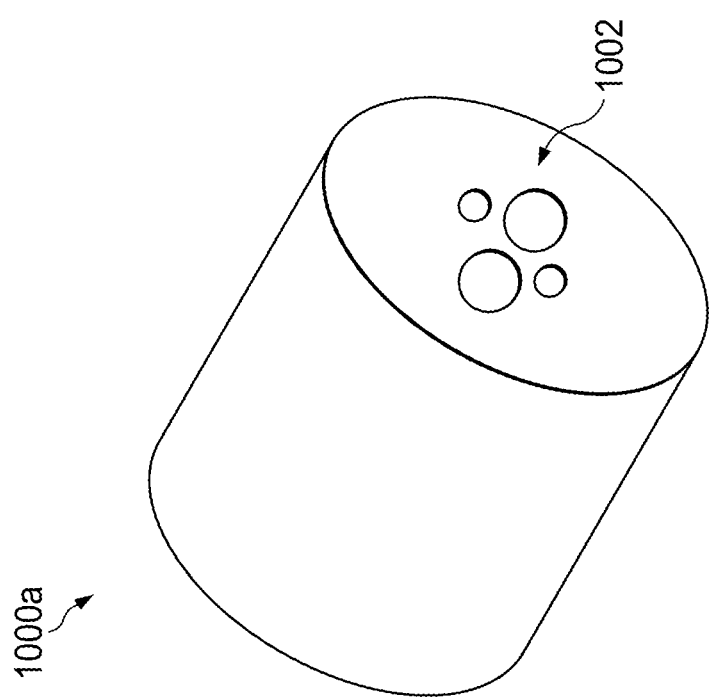

With regard to FIGS. 10A and 10B, illustrations of vessels 1000a and 1000b (collectively 1000) used in purchasing consumer products, such as beverages, by consumers is shown. The vessels 1000 may include a machine-readable medium coupled to the vessel 1000. The machine-readable medium may be any of a variety of readable mediums such as, but not limited to, a bubble code 1002 or a chip 1004. The chip 1004 may be the chip 802 of the machine-readable medium 800 of FIG. 8. The bubble code 1002 may be a series of resonant structures. Depending on a resonant frequency, one may create a signature. In one embodiment, a feature of the bubble code 1002 may be that the bubble code 1002 may be read without line of site. The bubble code 1002 may be conductive ink or a thin film and may be configured to be read and/or modified in response to a reader of a machine configured to dispense beverages outputting an electromagnetic energy above a threshold.

The machine-readable medium coupled to the vessel 1000a may be read by the reader as a user passes the vessel 1000a within reading distance of the reader. In one embodiment, the vessel 1000a may be purchased at a venue just prior to the user dispensing the beverage. In another embodiment, the vessel 1000a may be a long-term use vessel that may be brought to the venue by the user. One of ordinary skill in the art will appreciate that many methods of using vessels to provide consumer products, such as beverages, to consumers may be reasonably implemented into the beverage dispensing systems discussed herein.

The vessels 1000 may be configured for one-time use or may be configured for multiple use scenarios. Furthermore, the vessels 1000 may be configured to be modifiable such that the venue may set a number of uses that corresponds with a purchase made by the user. As such, the machine-readable medium may be writable in addition to being readable.

Figure 11:
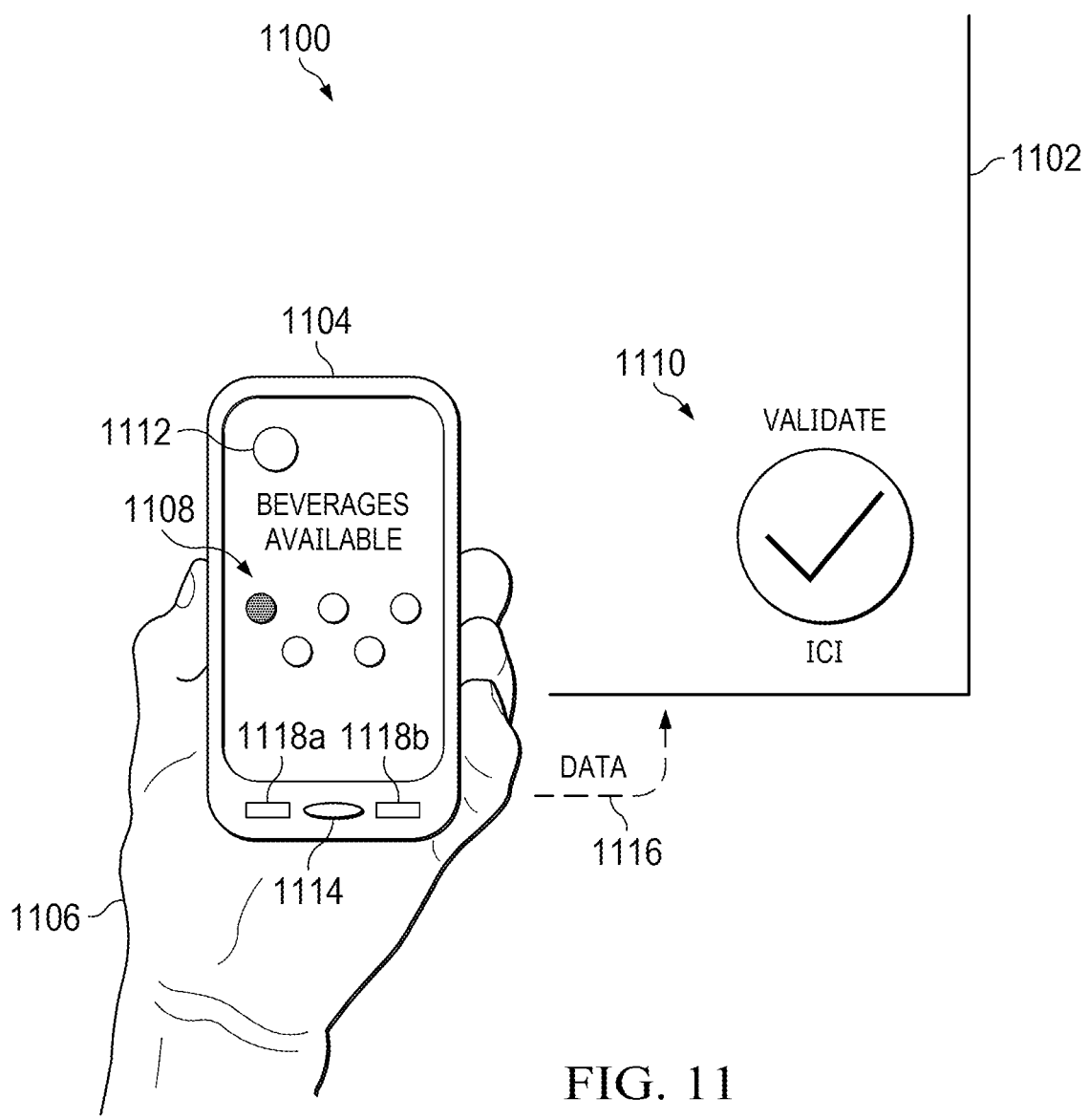
FIG. 11 is an illustration of a mobile device configured to communicate with a beverage dispensing system that provides consumer products, such as beverages.

With regard to FIG. 11, an illustration of a beverage dispensing system 1100 that provides consumer products, such as beverages, to a consumer is shown. The beverage dispensing system 1100 may include a machine 1102 that is configured to be communicative with a mobile device 1104. The mobile device 1104 may be operated by a user 1106 through the use of a mobile application 1108. The machine 1102 may be further configured to visually communicate with the user 1106 through a user interface 1110. The communication between the machine 1102 and the mobile device 1104 may be a wireless communication through a wireless communication network.

The mobile device 1104 is shown to be executing the mobile application 1108 that may be developed with an SDK, as understood in the art. The mobile application 1108 may be produced by one or more publisher of mobile apps, and may be configured to utilize any type of communication protocol or device that is specific to the machine 1102. For example, the machine 1102 may be communicated by the mobile device 1104 along with other metadata that the respective mobile application 1108 may utilize. In an embodiment, the mobile device 1104 may include at least one of a first sensor 1112, a second sensor 1114, a third sensor 1118a, and a fourth sensor 1118b for obtaining biometric data of the user 1106. In one embodiment, the first sensor 1112 may be an integrated front facing camera. The front facing camera may be a camera that is internal to the mobile device 1104 and be used to capture images of the user 1106. In one embodiment, the second sensor 1114 may be a fingerprint scanner. The fingerprint scanner may be a hardware component of the mobile device 1104, and be configured to obtain an image or data points of a fingerprint of the user 1106, as understood in the art. In one embodiment, the third sensor 1118a and fourth sensor 1118b (collectively 1118) may be integrated microphones. The integrated microphones may be hardware components of the mobile device 1104, and be configured to obtain recordings of a voice of the user 1106, as understood in the art.

In one embodiment, the mobile device 1104 may be configured to communicate the biometric data in a raw format to the machine 1102. In another embodiment, the mobile device 1104 may be configured to communicate data derived from the raw format of the biometric data. In yet another embodiment, the mobile device 1104 may be configured to verify user identity entirely in the mobile application 1108.

In an embodiment of a use of the beverage dispensing system 1100, the user 1106 may approach the machine 1102 to purchase a beverage. The user 1106 may open the mobile application 1108 on the mobile device 1104. The mobile application 1108 may include a method of selecting a beverage to be dispensed in a condition that an available balance is sufficient for dispensing the beverage. The available balance may be associated with the user and may be a balance stored locally on the mobile device 1104 or, alternatively, stored in a remote location, such as the cloud. The balance may be a total number of beverages, fluid ounces, milliliters, or otherwise, and may have an associated time period. Once the user 1106 has selected a beverage to be dispensed, the mobile application 1108 may communicate with electronics internal to the mobile device 1104 that a message may be sent to the machine 1102 indicating that the beverage may be dispensed. The machine 1102 may indicate to the user, via the user interface 1110, that a request has been received, and that the request has been processed. The machine 1102, in response to receiving a communication from the mobile device 1104 of a selected beverage, may enable the user to dispense the beverage. The mobile device 1104 may include a variety of devices, such as personal computers, cellular phones, tablets, laptops, televisions, gaming consoles, and/or other devices. An amount dispensed may be written back to the device in real-time such that when the user completes beverage dispense a correct amount remaining may be recorded.

With regard to FIG. 12, an illustration of an electrical schematic of a machine 1200 that is used for dispensing consumer products, such as beverages, to a consumer is shown. A user may introduce a medium 1202, such as the machine-readable medium discussed hereinabove, to the machine 1200. The machine 1200 may include a read/write sensor 1204, a processor 1206, pump controls 1208, and a display 1210. The machine 1200 may be electronically coupled to a biometric sensor 1216 and a microphone 1220. In one embodiment, the biometric sensor 1216 may be internal to the machine 1200. The processor 1206 may include memory 1212. The read/write sensor 1204 may be configured to communicate data 1214 to the processor 1206. The data 1214 may be data that is received from, or read from, the medium 1202. The biometric sensor 1216 may be configured to communicate biometric data 1218 to the processor 1206. The biometric data 1218 may be biometric data (e.g., image, fingerprint data, etc.) of the user that is obtained in response to the user being within reading distance of the biometric sensor 1216. The microphone 1220 may be configured to communicate biometric audio data 1222 to the processor 1206. The biometric audio data 1222 may be biometric audio data (e.g., voice recording, vocal tones, vocal vibrations, etc.) of the user that is obtained in response to the user being within reading distance of the microphone 1220 and speaking recognizable commands and/or dialogue.

In operation, the processor 1206 may be configured to be electronically communicative with the read/write sensor 1204, the pump controls 1208, the display 1210, and the biometric sensor 1216. The data 1214, the biometric data 1218, and the biometric audio data 1222 may be stored in the memory 1212. Furthermore, modifications to the data 1214, such as an updated available balance, may also be written to the memory 1212. In one embodiment, the processor 1206 may be referred to as a central processor unit (CPU). The processor 1206 may be implemented as one or more CPU chips, one or more cores (e.g., a multi-core processor), or may be part of one or more application specific integrated circuits (ASICs) and/or digital signal processors (DSPs). The processor 1206 may be configured to implement any of the processes described herein, and may be implemented using hardware, software, firmware, or combinations thereof.

The read/write sensor 1204 may be configured to be electronically communicative with the medium 1202. The read/write sensor 1204 may read data from the medium 1202. The read/write sensor 1204 may then communicate the data 1214 to the processor 1206. Furthermore, the read/write sensor 1204 may be further configured to receive communication from the processor 1206. In response to the communication from the processor 1206, the read/write sensor 1204 may write data to the medium 1202. For example, the processor 1206 may receive beverage balance data from the medium 1202, deduct a beverage value (such as volume) from the beverage balance, and write a new beverage balance to the medium 1202.

The pump controls 1208 may be configured to receive a communication from the processor 1206 indicating that a beverage may be dispensed. The pump controls 1208 may be further configured to control a beverage dispenser. The pump controls 1208 may initiate, pause, and terminate dispensing of the beverage. Furthermore, the pump controls 1208 may be configured to communicate to the processor 1206 that the dispensing of the beverage is completed, that there has been an error in the dispensing of the beverage, or any other of a variety of messages.

The display 1210 may be configured to be electronically communicative with the processor 1206. The display 1210 may be configured to display representations of data to the user. The display 1210 may display in color or monochrome and may be equipped with a touch sensor based resistive and/or capacitive technologies. The display 1210 may be further configured to be an input device that may allow the user to input commands to the processor 1206. In the case that the display 1210 includes a touch sensor, the display 1210 may also be considered an input device. In addition to and/or in the alternative, an input device including a mouse, built-in keyboard, external keyboard, television remote control, gaming console controller, and/or any other device that a user may employ to interact with the machine 1200 may be configured to be used in connection with the processor 1206 and the display 1210. One of ordinary skill in the art will appreciate that a variety of methods for communicating between the user and the machine 1200.

With regard to FIG. 13, an illustration of a flow diagram of a beverage dispensing method 1300 for providing consumer products, such as beverages, to a consumer is shown. The beverage dispensing method 1300 may start at step 1302 in response to a user initiating a beverage dispensing request by placing a machine-readable medium within reading distance of a reader of a machine configured to dispense beverages.

At step 1304, the reader may read data representative of an available balance for the user to obtain beverages from the machine-readable medium. The reading the data may be in response to the user positioning the machine-readable medium within reading distance of the reader. The machine may determine whether the available balance is sufficient to dispense the beverage before enabling the user to dispense the beverage. At step 1306, biometric data may be obtained from the user. User identity may be verified by comparing the biometric data with previously stored biometric data of a previous user associated with the machine-readable medium. Obtaining the biometric data may be in response to the user positioning a biometric source, such as, but not limited, an eye or retina, face, voice sample, a fingerprint, or otherwise, within reading distance of a biometric sensor. The machine may determine whether the user is the previous user before enabling the user to dispense the beverage. At step 1308, the machine may enable the user to dispense the beverage into the vessel. During the beverage dispense, the machine, at step 1310, may update the available balance of the machine-readable medium which may reduce or prevent the user from dispensing unlimited beverages, and exit at step 1312.

In one embodiment, the machine may be configured to dispense the beverage only when the machine-readable medium is within reading distance of the reader. For example, if the user initiates dispensing the beverage but removes the machine-readable medium from reading distance of the reader before the dispensing of the beverage has been completed, the machine may pause and/or terminate the remainder of the dispensing. However, because the amount has been continually written to the machine-readable medium the correct balance remains on the machine-readable medium.

Figure 14:
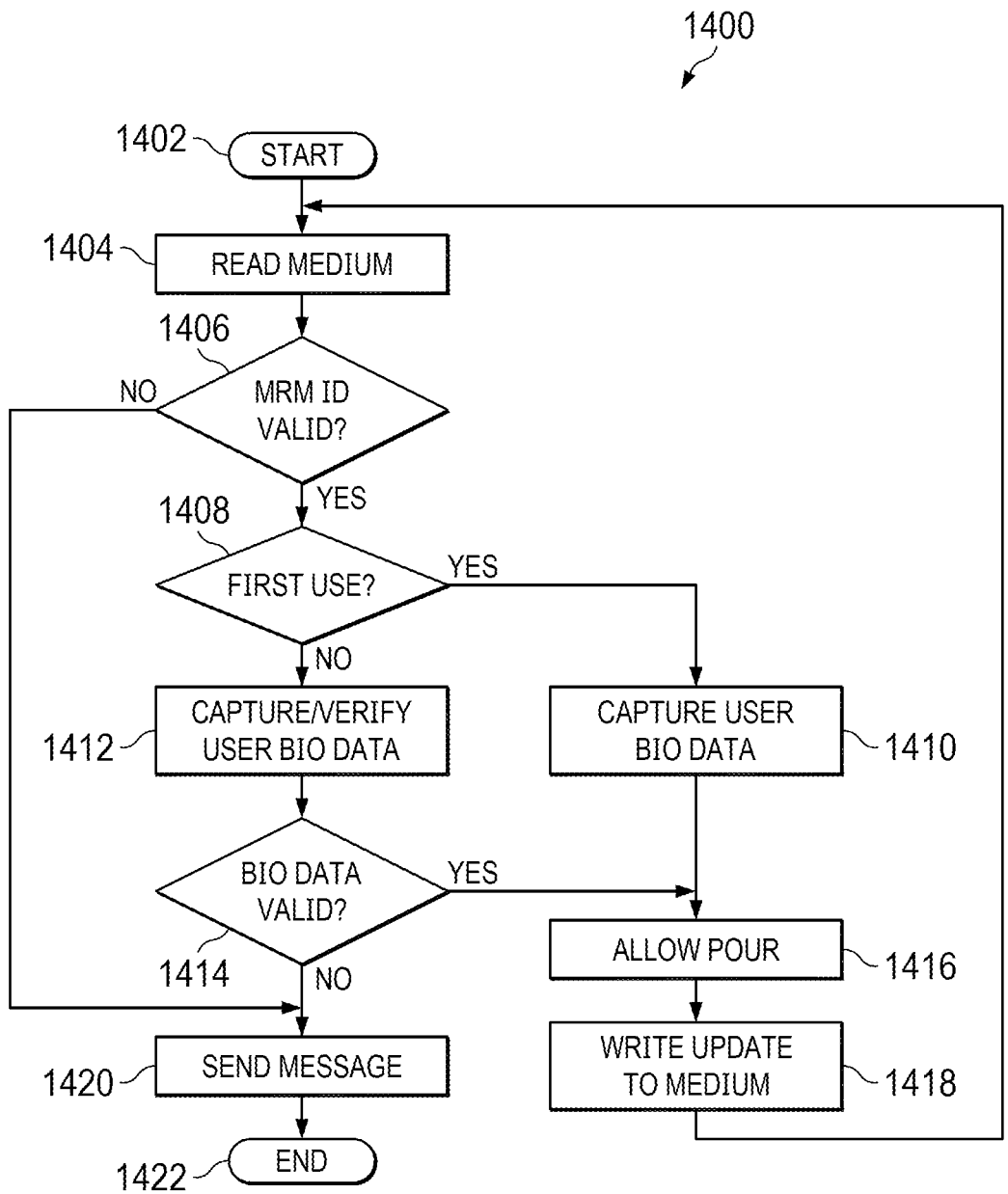
FIG. 14 is an illustration of a flow diagram of a beverage dispensing method for providing and regulating output of consumer products, such as beverages.

With regard to FIG. 14, an illustration of a flow diagram of a beverage dispensing method 1400 for providing consumer products, such as beverages, to consumers is shown. The beverage dispensing method 1400 may start 1402 in response to a user initiating a beverage dispensing request by placing a machine-readable medium within reading distance of a reader of a machine configured to dispense beverages.

Once the user has placed the machine-readable medium within reading distance of the reader of the machine, the machine may read the machine-readable medium at step 1404. At step 1406, the machine may determine if a valid identification exists on the machine-readable medium. Step 1406 may identify the biometric parameter a first time the user accesses the machine and validate subsequent biometric readings against the biometric parameter to verify that the user is a same user. In a condition that a valid identification exists, the machine may determine if the user is using the machine-readable medium for a first time at step 1408. In a condition that first use is determined, the machine may capture user biometric data at step 1410. The biometric data may be associated with a biometric parameter of a user such as, but not limited to, facial recognition and fingerprint scanning. One of skill in the art will appreciate that any biometric parameter may serve a similar function as those described herein. In a condition that the machine determines the user is not first using the machine-readable medium, the machine may capture and verify subsequent biometric readings against the biometric parameter to validate that the user is a same user at step 1412. The machine, at step 1414, may determine if the biometric data is valid and that the user is the same user. In a condition that the biometric data is valid, the machine may allow pouring and/or dispensing of the beverage at step 1416. Alternatively, returning to the condition that first use is determined and the machine initially captured user biometric data at step 1410, the machine may also proceed to step 1416 to allow pouring and/or dispensing of the beverage. The machine, at step 1418, may write an update to the machine-readable medium. The update may be written in real-time as the beverage is being dispensed, or may be written upon completion of the dispensing. The machine may return to step 1404 where the machine-readable medium may be read again and a determination of continued beverage dispensing may be made. In a condition that a valid identification is not established at step 1406 the machine may send an error message to the user at step 1420 and may exit 1422 the beverage dispensing method 1400. Additionally, in a condition that the biometric data is determined to be invalid at step 1414, in other words, the user is not a same user associated with a first pour associated with the machine-readable medium, the machine may send an error message to the user at step 1420 and may exit 1422 the beverage dispensing method 1400. One of ordinary skill in the art will appreciate that a variety of control methods for controlling valid identifications and available balances may exist and that each of the methods would fit into the method 1400 discussed hereinabove with respect to controlling dispensed beverages.

Figure 15:
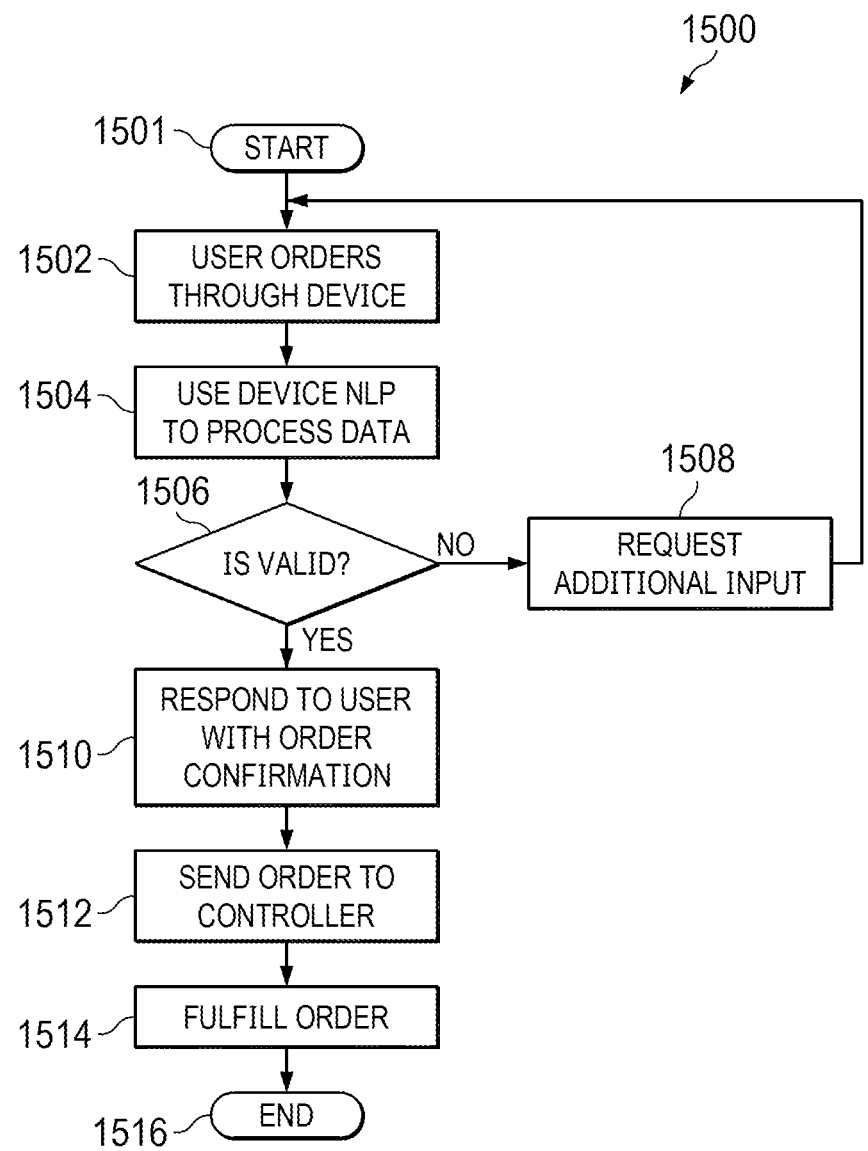
FIG. 15 is an illustration of a flow diagram of a beverage dispensing process for providing and regulating output of consumer products, such as beverages.

With regard to FIG. 15, an illustration of a flow diagram of a beverage dispensing process 1500 for providing and regulating output of consumer products, such as beverages, is shown. The beverage dispensing process 1500 may start at step 1501 and then receive an order or other command from a user at a device at step 1502, where the order or other command may be from a voice command of a user. The device may include a natural language processing device (e.g., general or signal processors) that may process the voice command, at step 1504, voice commands in the form of natural language captured by the device during the order by the user at step 1502. At step 1506, the beverage dispensing machine may determine if the order and/or captured recording is valid. In one embodiment, the determination may include searching for trigger words (e.g., names of brands, ingredients, flavors, etc.) that initiate an ordering process at the beverage dispensing machine. In one embodiment, the determination may include evaluating a recording to determine if a quality of the recording is sufficient for natural language processing.

In response to the beverage dispensing machine determining that the recording of a voice command is invalid, the machine may request additional input at step 1508. In one embodiment, the additional input may include more precise ingredients or commands. In one embodiment, the additional input may include more clarity or volume so that the order is better received by the machine. In an embodiment, digital signal processing filter(s) that reduce background noise may be utilized to better process speech commands of the user in noisy environments may be utilized. In response to a valid order determination at step 1506, the machine may communicate an order confirmation to the user at step 1510. The machine may then communicate the order to a controller at step 1512. The controller may be configured to operate the beverage dispensing machine so that the order may then be fulfilled at step 1514. For example, the controller may configure the machine to dispense a beverage with requested ingredient(s). The beverage dispensing method 1500 may then end at step 1516.

In one embodiment, the beverage dispensing process 1500 may be a process for receiving an order by a consumer from an electronic device capable of communicating with the beverage dispensing machine, displaying and/or repeating the order to the consumer, receiving a vend/pour command, and asking the consumer if they would like another order. The electronic device may be a smartphone of the user, tablet positioned on tables, or wall of a venue, or otherwise. The machine may either or both present visual and audio communications for a user to respond either or both via the user interface being displayed and via a microphone with speech. The beverage dispensing machine may set a timer to a threshold of time so that when the threshold of time has been reached, the machine may reset and wait for a next consumer. Otherwise, the machine may continue to process orders from the consumer.

Figure 16:
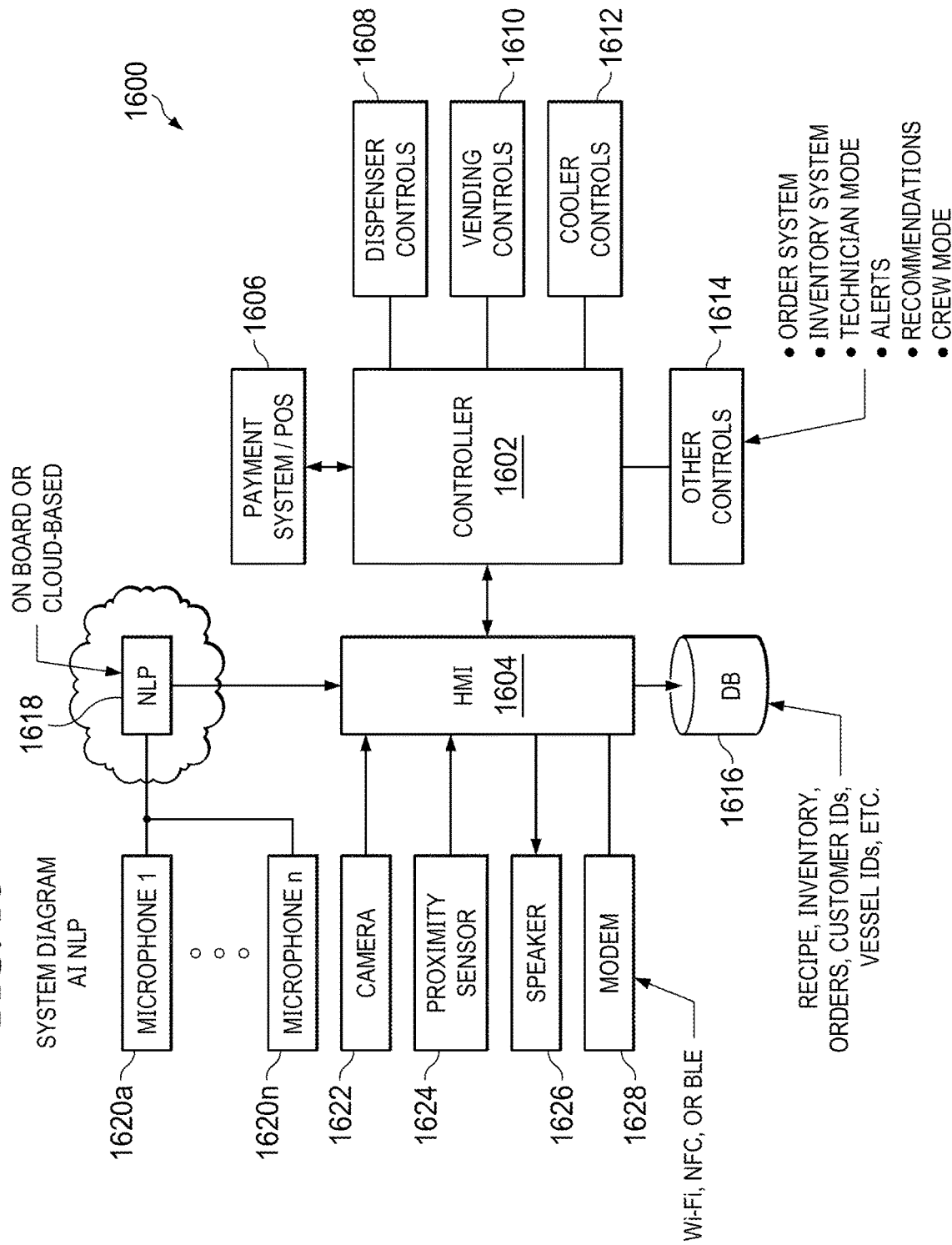
FIG. 16 is an illustration of a schematic of electronics of a beverage dispensing system that is used for providing consumer products, such as beverages, and processing language and/or voice signals.

With respect to FIG. 16, an illustration of a schematic of electronics of a beverage dispensing system 1600 that is used for providing consumer products, such as beverages, and processing language is shown. The beverage dispensing system 1600 may include a controller 1602, an order management system 1604, such as HMI, a point-of-sale (POS) 1606, various different machine controls (e.g., push buttons touch screens, etc.) 1608, 1610, 1612, 1614, and the controls may provide for ordering. A database 1616 configured to store recipes, inventories, orders, customer IDs, vessel IDs, and so on executed may be on the machine 1600.

The database 1616 may include one or more libraries of user commands that are phonetically distinct from one another to avoid users of different aspects of the system 1600 from accessing and/or performing unauthorized commands. For example, a consumer who desires to select and dispense beverages should not have the ability to access usage, inventory, or maintenance data. Similarly, an operator who is responsible for maintaining inventory of beverage ingredients may not be provided access to maintenance records. Therefore, the system 1600 may determine a user type, and thereafter limit access to a proper library of user commands associated with the user type.

In one embodiment, the beverage dispensing system 1600 may include a natural language processing unit (NLP) 1618. In another embodiment, the NLP 1618 is a cloud-based NLP in electrical communication with the beverage dispensing system 1600. In yet another embodiment, the NLP 1618 may be local to the dispensing system 1600, but be external so that multiple dispensing systems within a venue may share the NLP 1618. The NLP 1618 may be electrically communicative with input devices, such as microphones 1620*a*-1620*n* (collectively 1620).

In one embodiment, the HMI 1604 may be electrically communicative with inputs, such as at least one of a camera 1622, a proximity sensor 1624, a speaker 1626, and a wireless communication device 1628. In one embodiment, at least one of the microphones 1620, the camera 1622, the proximity sensor 1624, the speaker 1626, and the wireless communication device 1628 may be disposed internal and/or attached to hardware of the beverage dispensing system 1600. One of skill in the art will appreciate that any mixture of internal and external components is understood.

Inputs, such as the microphones 1620, camera 1622, proximity sensors 1624, and speakers 1626, may be configured to receive voice commands from a user, as further described herein. A wireless device or other electronic device that is wired that has pre-existing order may connect to the beverage dispenser for submission of an order. The wireless communication device 1628 may include a modem for connecting to a device via a wireless technology, such as, but not limited to, BLE, Wi-Fi, and NFC. The inputs may be electrically communicative with the NLP 1618, either onboard, local, or external in a cloud, or with the HMI 1604. The HMI 1604 may create a recipe from order data and the database 1616. The recipe may be sent to the controller 1602 for fulfillment.

The controller 1602 may include one or more processors or control devices. In one embodiment, the controller 1602 may be in a beverage dispensing machine and electrically communicative with dispenser controls 1608 of the beverage dispensing machine. In one embodiment, the controller 1602 may be in a beverage vending machine and electrically communicative with vending controls 1610 of the beverage vending machine. In one embodiment, the controller 1602 may be in a cooler and electrically communicative with cooler controls 1612 of the cooler. In one embodiment, the controller 1602 may be electrically communicative with other controls 1614, such as frozen beverage machine controls, of the beverage dispensing system 1600. The controller may also be electrically communicative with the POS 1606 and any associated payment systems to complete pay-for-product transactions.

The beverage dispensing system 1600 may include additional controls and databases, such as, but not limited to, inventory, error states, sold out protocols, alerts, crew mode, technician mode, or any other order systems known to those of skill in the art, such as product ordering, service/repair work-order creation, and restrictions for various types of users (e.g., a diabetic cannot receive a high glycemic index beverage, etc.).

Figure 17:
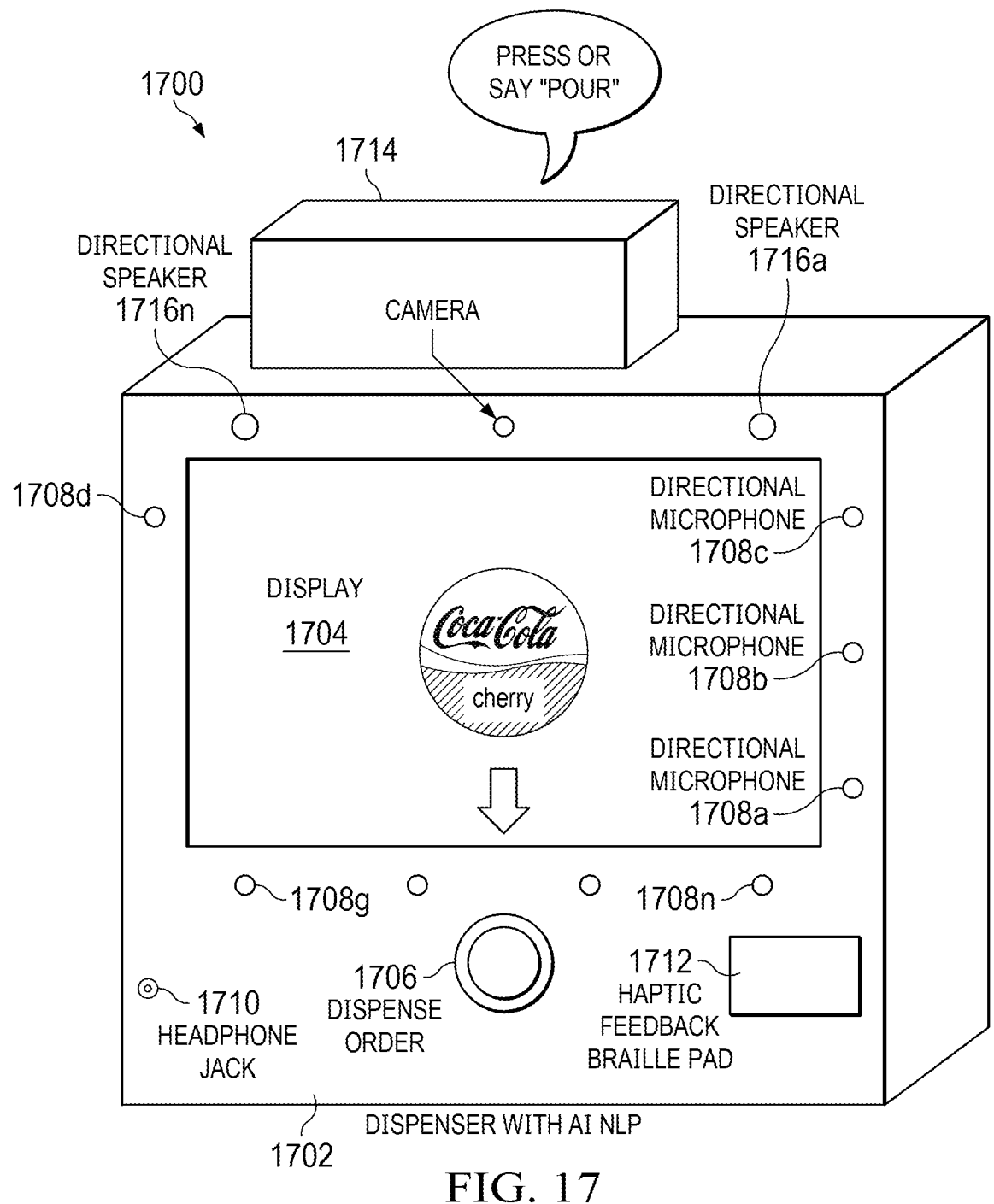
FIG. 17 is an illustration of a machine that dispenses consumer products, such as beverages, inclusive of language processing hardware.

With regard to FIG. 17, an illustration of a machine 1700 that dispenses consumer products, such as beverages, inclusive of language processing hardware is shown. The machine 1700 may include electrical components, such as those of the beverage dispensing system 1600 of FIG. 16. The machine 1700 may include a dispenser 1702, a display 1704, a button 1706, microphones 1708a-1708n (collectively 1708), such as the microphones 1620 of FIG. 16, a headphone jack 1710, a haptic feedback device 1712, a speaker 1714, such as the speaker 1626 of FIG. 16, and cameras 1716a-1716n (collectively 1716), such as the camera 1622 of FIG. 16.

The display 1704 may be configured for user interfacing. The microphones 1708 may be disposed around the display 1704 to enable producing recordings (e.g., high-quality recordings) of commands from a user nearest the machine 1700. The headphone jack 1710 may be configured to provide audio to a user having visual impairments in a condition of the machine 1700 not having the speaker 1714. The speaker 1714 nay be a directional speaker that may be heard by a user standing substantially in front of and within a specific range of the dispenser 1702. The haptic feedback device 1712 may be a brail pad for use by deaf and/or blind users.

Figure 18:
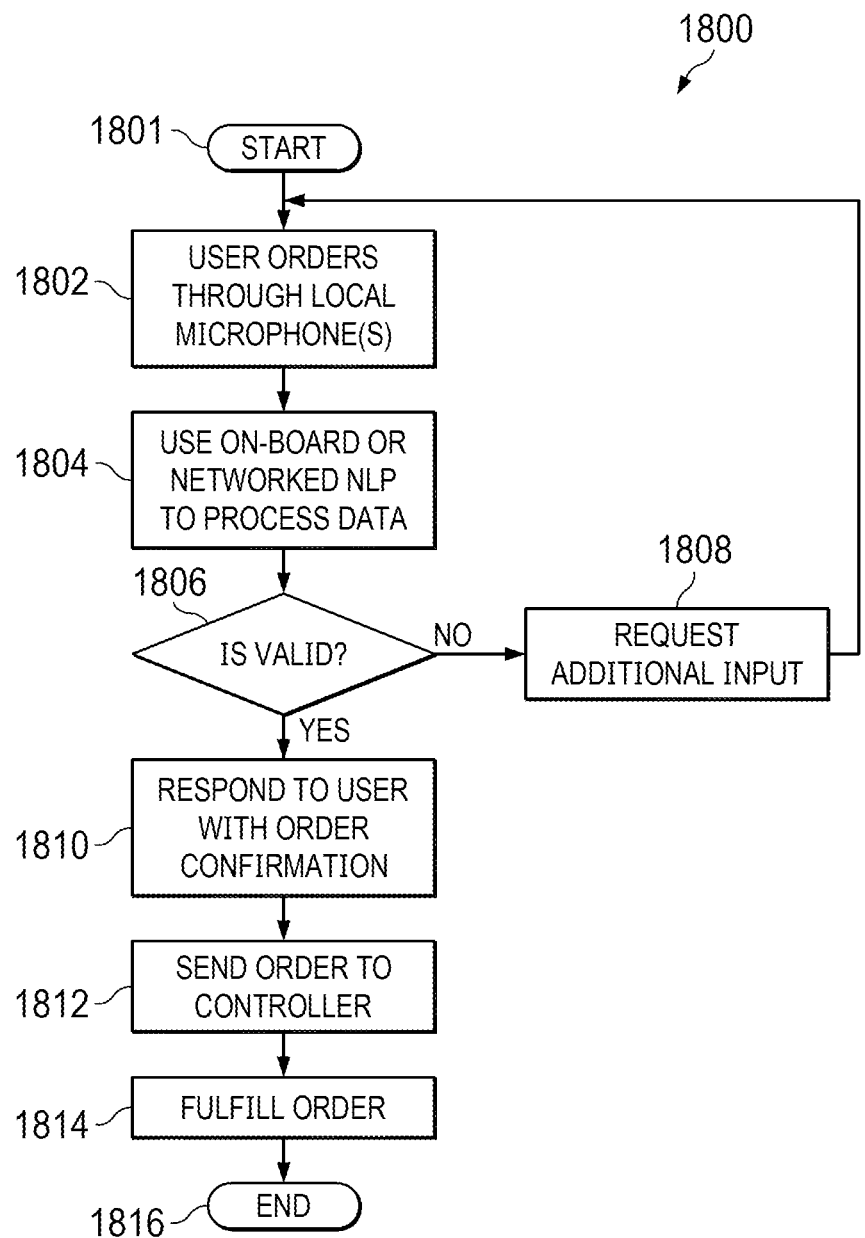
FIG. 18 is an illustration of a flow diagram of a beverage dispensing method for providing and regulating output of consumer products, such as beverages, using natural language processing.

With regard to FIG. 18, an illustration of a flow diagram of a beverage dispensing process 1800 for providing and regulating output of consumer products, such as beverages, using natural language processing is shown. The beverage dispensing process 1800 may start at step 1801. An order may be received from a user at a beverage dispensing machine at step 1802 by capturing a voice of the user during the order. The beverage dispensing machine may include a natural language processing device that may process, at step 1804, natural language captured by the device during the order by the user at step 1802. Steps 1806-1816 may be the same or similar to steps 1506-1516 of FIG. 15.

Figure 19:
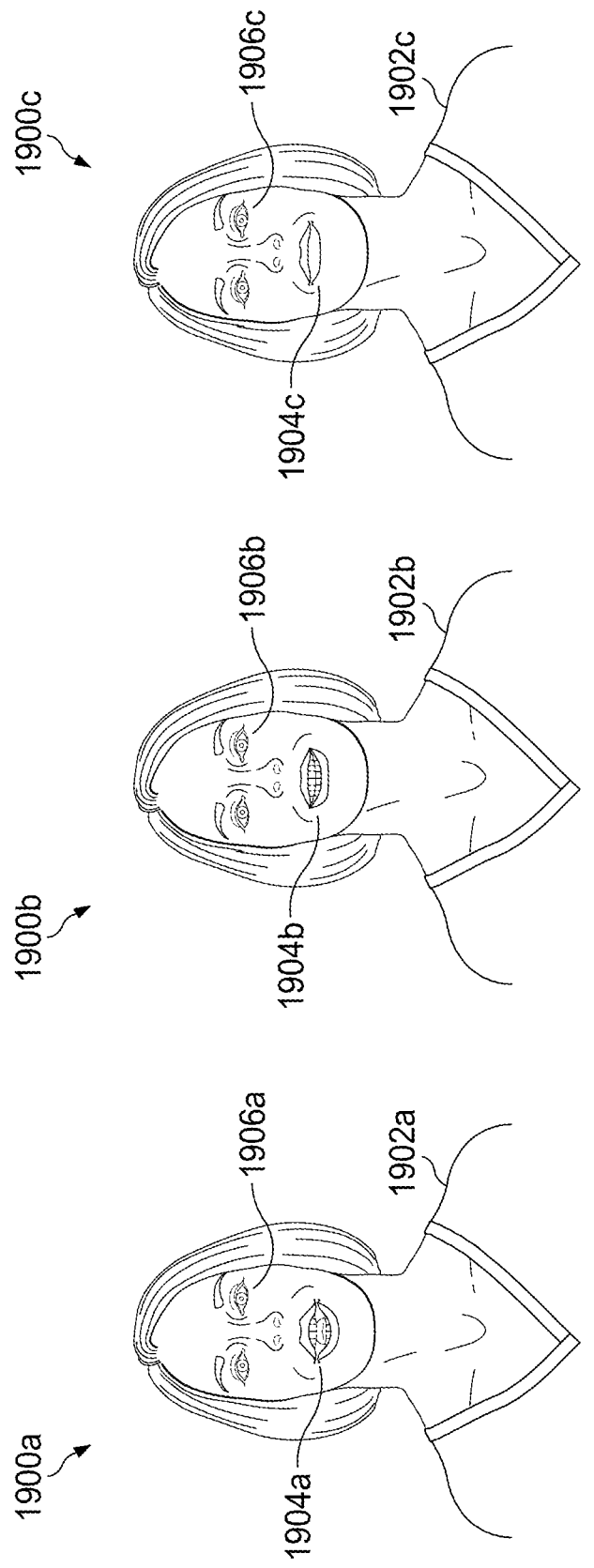
FIG. 19 is an illustration of lip movement by a user that may be read by a machine in an environment having background noise above a threshold that limits the machine to adequately process language of the user.

With regard to FIG. 19, an illustration of lip movement 1900a, 1900b, 1900c (collectively 1900) by a user 1902a, 1902b, 1902c (collectively 1902) that may be imaged, processed, and used by a machine in response to an environment having background noise above a threshold that allows the machine to process language of the user is shown. The user may move their lips 1904a, 1904b, 1904c (collectively 1904) and/or eyes 1906a, 1906b, 1906c (collectively 1906) in a manner that may allow a camera and processor to estimate orders and/or commands by the user 1902. Lip movements 1900 may correspond to a language or directly to corresponding orders and/or commands understandable by the machine. The machine may utilize lip movement analysis in environments where background noise may be too difficult to overcome and the machine may not be able to identify the user 1902 from others standing in line or at a proximate machine.

In an embodiment, the machine may determine an identify of the user, not necessarily who the user is, but that the user is a same user as previously used the machine, by identifying or "fingerprinting" frequencies, such as formant frequencies, of the user's voice. The knowledge of the user's identity and past history of using the machine (e.g., beverage dispenses) may, in combination of reading the user's lips, help with presenting selection options (e.g., refill), and performing commands (e.g., display past orders). The use of voice recognition may be used to manage dispensing quantities to comply with regulations and/or reduce fraud may also be performed in the same or similar manner as previously described.

Figure 20:
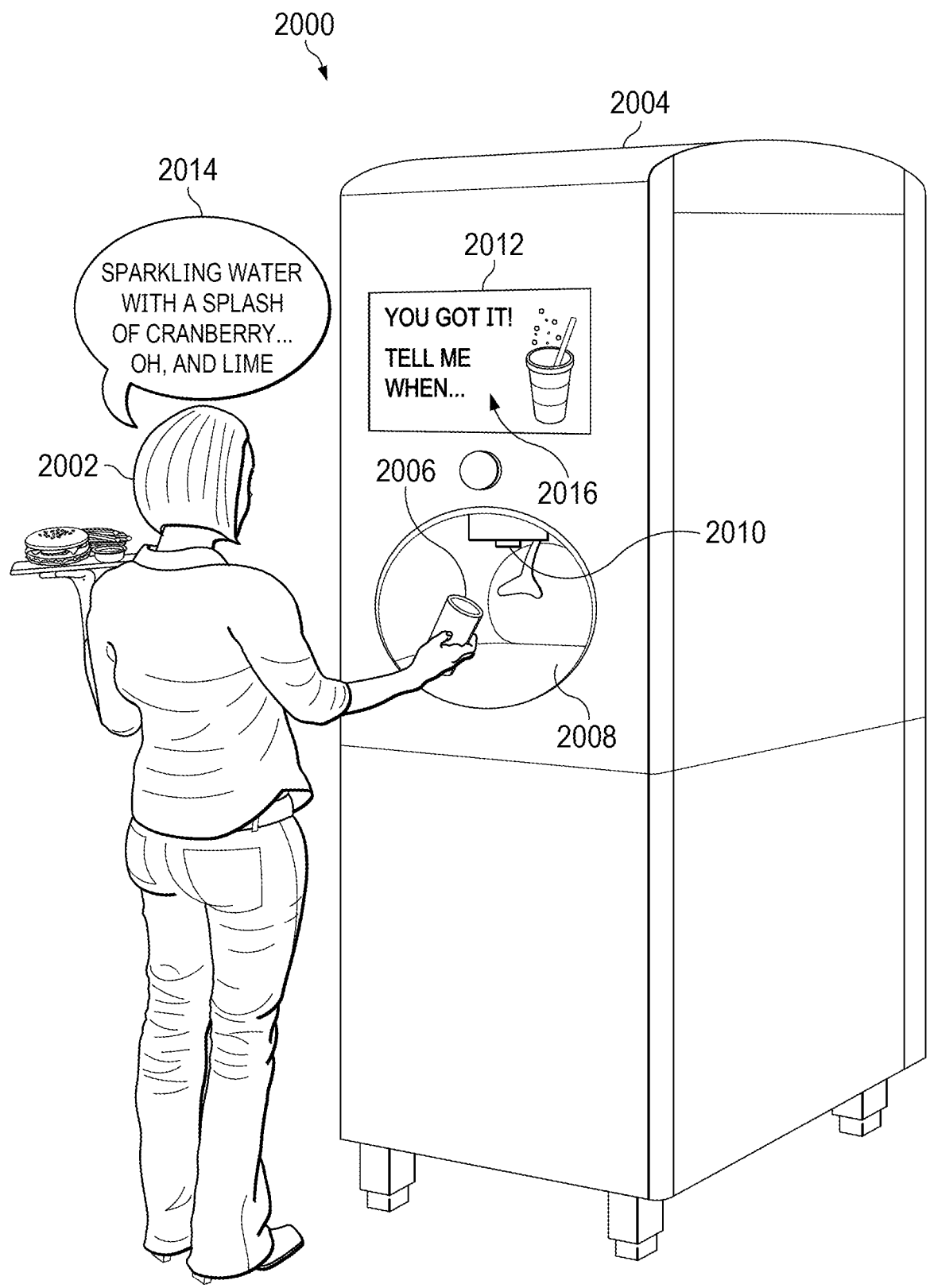
FIG. 20 is an illustration of a machine that dispenses consumer products, such as beverages, in response to voice commands.

With regard to FIG. 20, an illustration of a machine 2000 that dispenses consumer products, such as beverages, in response to voice commands is shown. The machine may be approached by a user 2002. The machine may include a dispenser 2004 with which the user 2002 may interface. The user may place a vessel 2006 in a cavity 2008 of the dispenser 2004 and substantially below a nozzle 2010. The dispenser 2004 may further include a display 2012 with which the user 2002 may use to interact with electronics internal to the dispenser 2004.

The user 2002 may initiate an order by speaking a command 2014 inclusive of command words and ingredients. The command words may include, but are not limited to, "pour," "dispense," "stop pouring," "mix," "light ice," and other commands appreciated by those of skill in the art. One of skill in the art will also appreciate that commands specific to the dispenser 2004 may be programmed and modified. In response to an order command 2014 by the user 2002, the dispenser 2004 may communicate a message 2016 on the display 2012. In one embodiment, the message 2016 may include confirming the command 2014 by the user 2002. In one embodiment, the message 2016 may include a request for confirmation by the user 2002 that a representation of the command 2014 also communicated on the display 2012 is consistent with the command 2014. In one embodiment, the message 2016 may include a notification that pouring is about to commence and/or has already commenced. One of skill in the art will appreciate that a number of communications may be appropriate for interfacing with the user 2002. In one embodiment, the user 2002 may speak further commands that control stopping and starting the pouring of the beverage, similar to pushing a pour button as referenced hereinabove with regards to FIG. 1.

Figure 21:
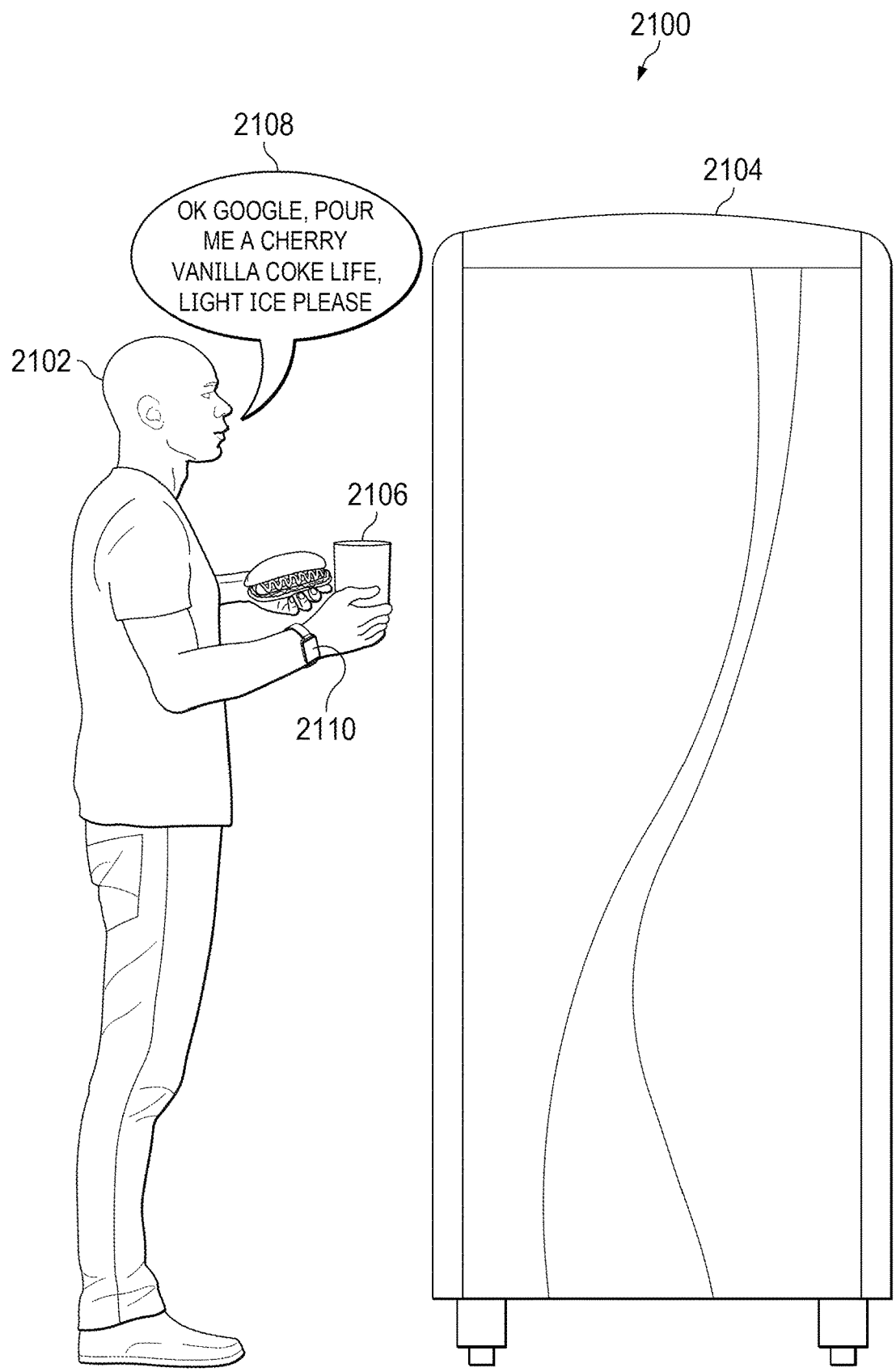
FIG. 21 is an illustration of a machine that dispenses consumer products, such as beverages, in response to voice commands to existing hardware solutions for natural language processing.

With regard to FIG. 21, a machine 2100 that dispenses consumer products, such as beverages, in response to voice commands to existing hardware solutions for natural language processing is shown. A user 2102 may approach a dispenser 2104 of the machine 2100 with a vessel 2106 to initiate an order by speaking an order command 2108, such as described in FIG. 20. In one embodiment, the order command 2108 may be a command understood by existing hardware and/or software solutions for natural language processing, such as, but not limited to, natural language processing applications in mobile devices and dictation applications. One of skill in the art will appreciate that a number of natural language processing applications exist and are equally suited for implementation internally or externally to the machine 2100.

In one embodiment, the user 2102 may speak the order command 2108 into a wearable device 2110. The wearable device 2110 may include a processing unit configured to create order data in response to the order command 2108. The processing unit may be further configured to send an order signal representative of the order data to the dispenser 2104 via a wireless communication. One of skill in the art will appreciate that the wearable device 2110 may be any mobile device inclusive of natural language processing.

Figure 22:
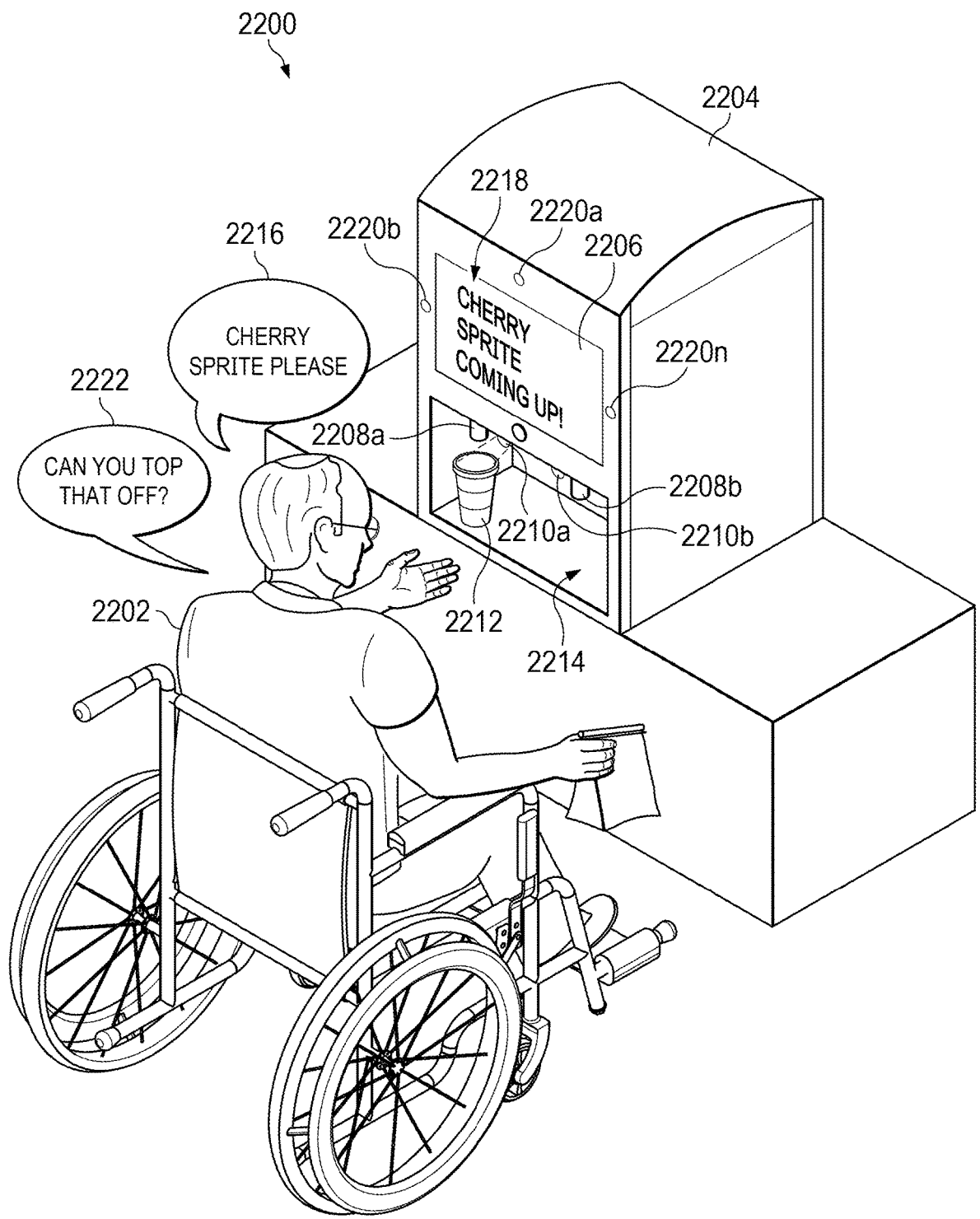
FIG. 22 is an illustration of a machine that dispenses consumer products, such as beverages, in response to voice commands.

With regard to FIG. 22, a machine 2200 that dispenses consumer products, such as beverages, in response to voice commands by a user 2202 is shown. The machine 2200 may include a dispenser 2204, a display 2206, nozzles 2208a, 2208b (collectively 2208) for dispensing the beverage, and content detection cameras 2210a, 2210b (collectively 2210) for detecting a presence of a vessel 2212 and data representative of contents of the vessel 2212.

The user 2202 may place the vessel 2212 in a cavity 2214 of the dispenser 2204 substantially under one of the nozzles 2208. The user 2002 may initiate and order by speaking an order command 2216, such as the order command 2014 of FIG. 20, into a microphone 2220a-2220n (collectively 2220) of the dispenser 2204. The dispenser 2204 may communicate a message 2218 that may include information regarding the order on the display 2206. The dispenser 2204 may be configured to receive commands throughout fulfillment of the order. In one embodiment, the user 2202 may speak a supplemental command 2222 after pouring of the beverage has been initiated, such as, but not limited to, a request to top off the vessel 2212 with the beverage, a request to change ingredients of the beverage for a remaining portion of the pour, and others understood by those of skill in the art.

In one embodiment, the content detection cameras 2210 may be configured to determine a content level of the vessel 2212. The content detection cameras 2210 may communicate the content level to electronics of the dispenser 2204. The dispenser 2204 may respond to supplemental commands 2222 based on the content level. In one embodiment, the content level may be used by the dispenser 2204 to automate a pour that reaches a desired threshold of filling up the vessel 2212 (e.g., 95% full, reaching a demarcation inside the vessel 2212, etc.).

Figure 23:
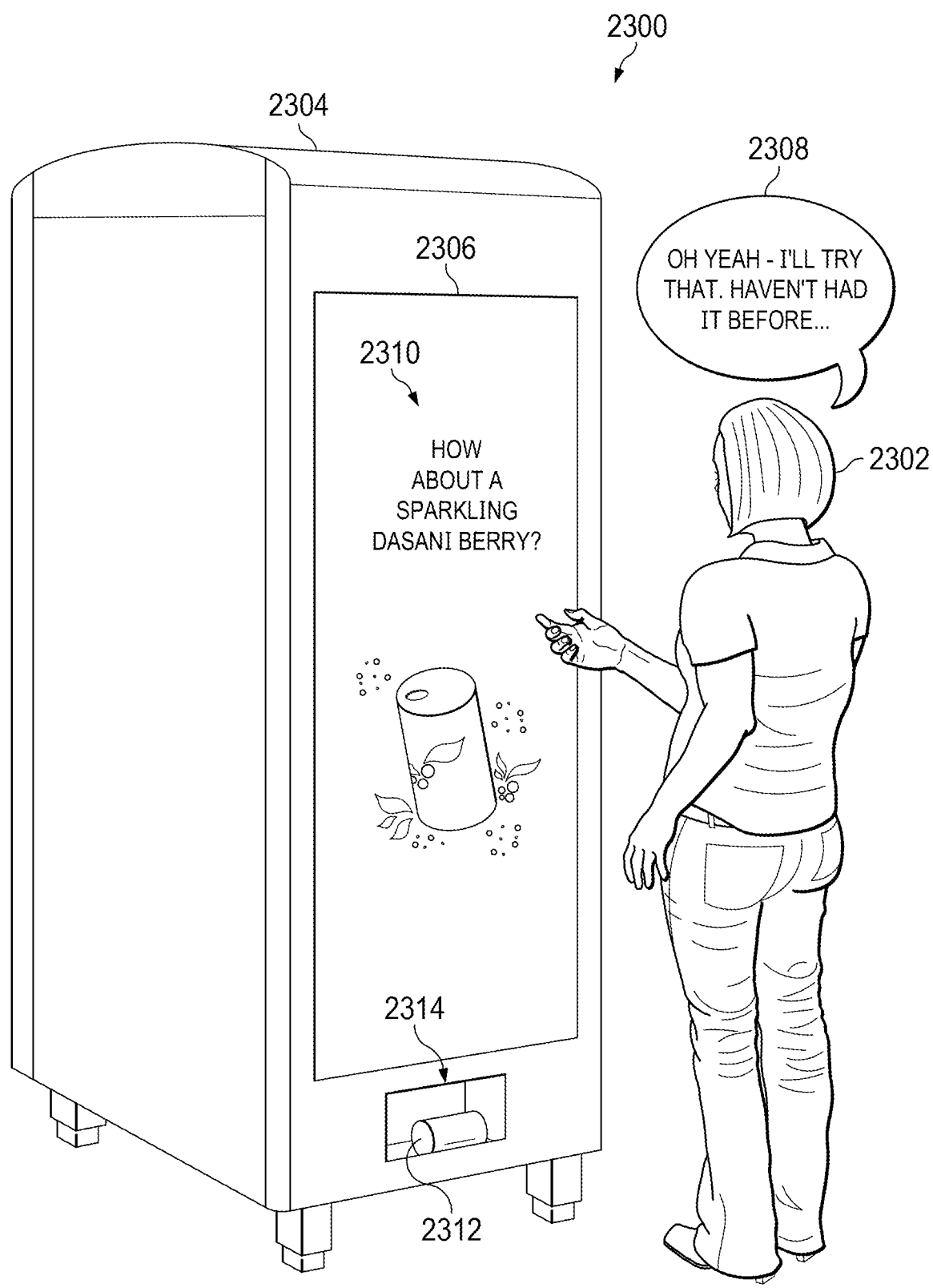
FIG. 23 is an illustration of a beverage vending system inclusive of a machine that dispenses consumer products in response to voice commands.

With regard to FIG. 23, a beverage vending system 2300 inclusive of a machine 2304 that dispenses consumer products in response to voice commands by a user 2302 is shown. The machine 2306 may include a display 2306. The user 2302 may speak and order command 2308 to the machine 2306 that initiates an order. The machine 2304 may include advertisements 2310 on the display 2306. In one embodiment, the advertisement 2310 may be associated with a beverage option at the machine 2306. The user 2302 may select a beverage in response to the advertisement 2310. In one embodiment, the advertisement 2310 may related to a subject not associated with the beverage vending system 2300.

In response to the user 2302 speaking the order command 2308, the machine 2304 may dispense a vessel 2312 inclusive of the user's preference into a receiving cavity 2314 of the machine 2304. In one embodiment, additional commands may be associated with the advertisement 2310 (e.g., "I'll try that" may initiate an order of a beverage displayed in the advertisement 2310). One of skill in the art will appreciate that a variety of commands exist that relate an order to an advertisement.

Figure 24:
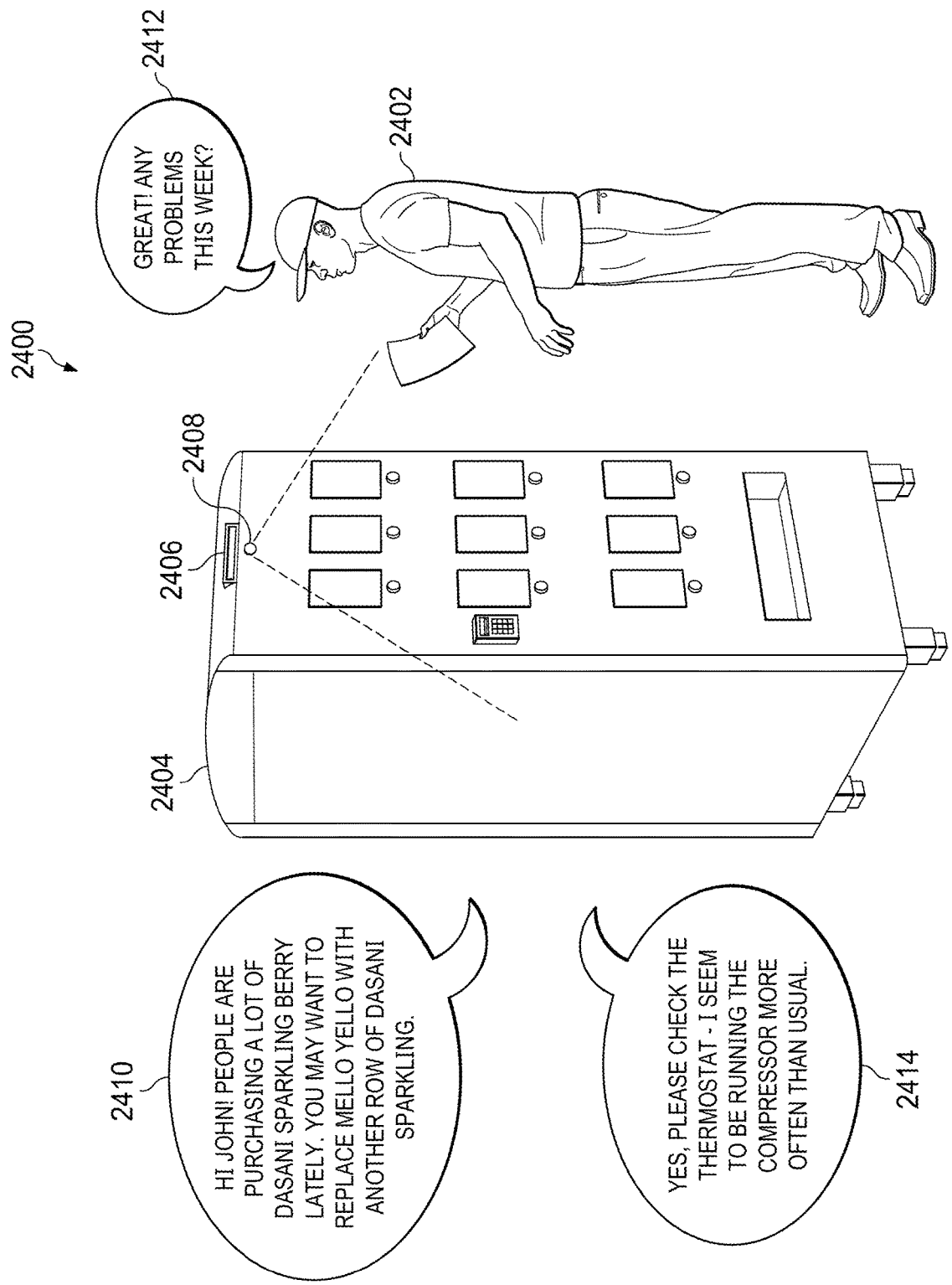
FIG. 24 is an illustration of a machine that dispenses consumer products, such as beverages, that is configured to enable a technician to interact therewith using voice commands.

With regard to FIG. 24, a machine 2400 that dispenses consumer products, such as beverages, that is operable by a technician 2402 in response to voice commands is shown. The machine 2400 may include a dispenser 2404, a speaker 2406 for communicating messages to the technician 2402, and a camera 2408 for detecting that the technician 2402 has entered a field-of-view of the camera 2408.

In one embodiment, the dispenser 2404 may detect that the technician 2402 has entered the field-of-view of the camera 2408. In response to detecting the technician 2402, the dispenser 2404 may initiate a service message 2410 to the technician 2402. In one embodiment, the technician 2402 may initiate a request for the service message 2410. The service message 2410 may include, but is not limited to, purchase history of beverages, highly requested ingredients, shortages of ingredients, operational metadata, performance errors, electronic errors, mechanical errors, ingredient modification recommendations, and others understood by one of skill in the art. The technician 2402 may speak follow-up commands 2412 that initiate follow-up responses 2414 by the dispenser 2404. The follow-up commands 2412 and follow-up responses 2414 may address topics communicated in the service message 2410 as well as new topics.

In one embodiment, the service message 2410 may be used for taking inventory, product planning, or receiving diagnostics, which may include, but are not limited to, expired products, fast moving products, slow moving products, adding more of a fast moving product, removing a portion of a slow moving product, reporting errors, reporting mechanical issues, reporting theft attempts, and others understood by one of skill in the art.

Figure 25:
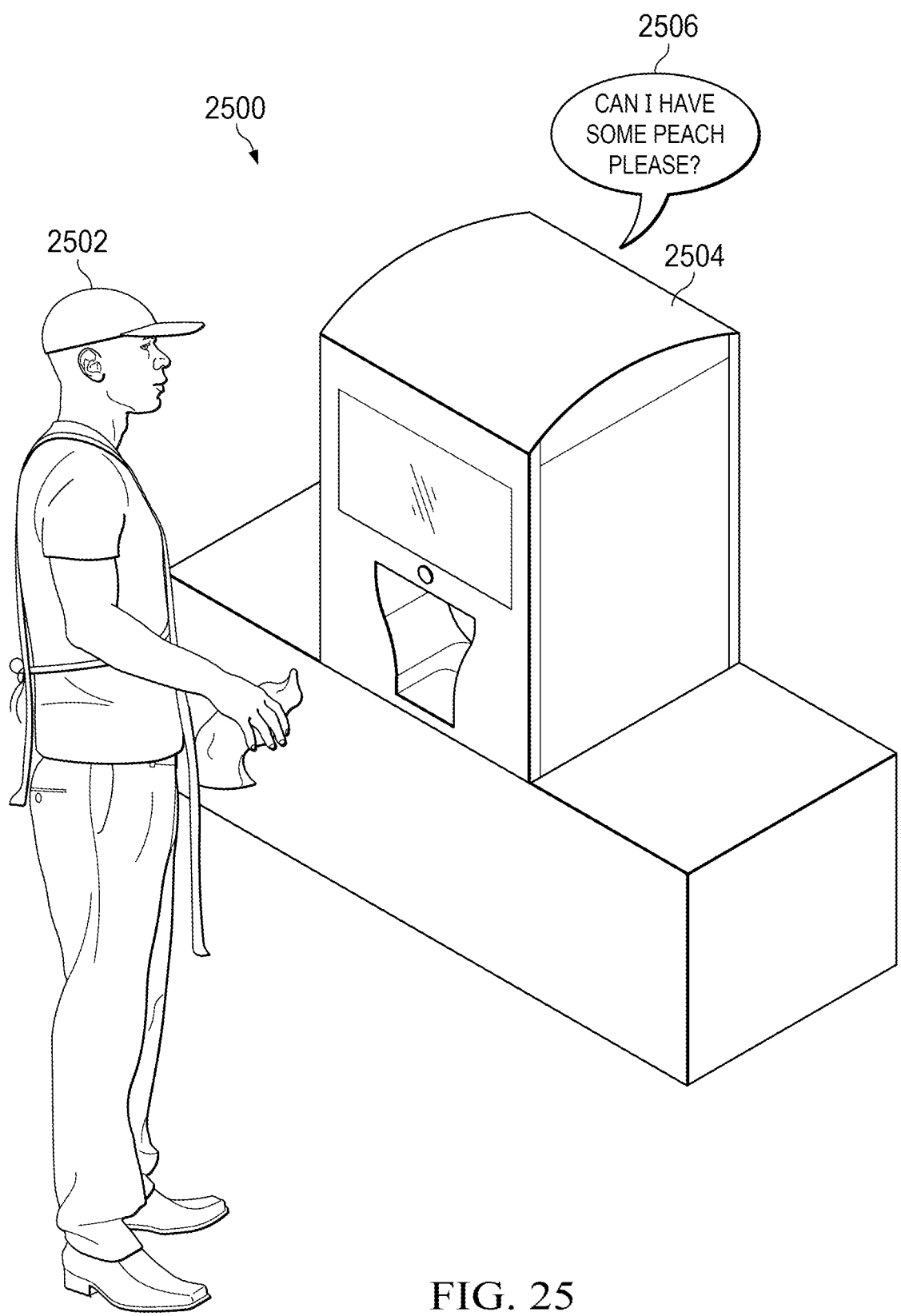
FIG. 25 is an illustration of a machine that dispenses consumer products, such as beverages, that is configured to enable venue personnel to interact therewith using voice commands.

With regard to FIG. 25, a machine 2500 that dispenses consumer products, such as beverages, that is operable by venue personnel 2502 in response to voice commands is shown. The machine may include a dispenser 2504. The dispenser 2504 may communicate an auditory message 2506 to the venue personnel 2502 a number of operational messages, such as, but not limited to, an ingredient is sold out and needs to be replace, as well as others understood by one of skill in the art. In one embodiment, the venue personnel 2502 may be identified by a biological parameter, such as, but not limited to voice recognition, voice signature analysis, frequencies of vocal commands, facial recognition, a fingerprint, and others as described hereinabove with regards to FIGS. 1-14. In one embodiment, the venue personnel may be identified by spoken personal information (e.g., birthdate, social security number, a previously set personal identification number (PIN), a previously set password or passphrase, etc.). One of skill in the art will appreciate that a number of security methods exist for access by a specified user. Furthermore, one of skill in the art will appreciate that the methods of identification described herein with regards to FIG. 25 may be used to identify a particular user, or type of user (e.g., consumer, technician, etc.). In one embodiment, a privileged type of user (e.g., technician, operator, venue personnel, etc.) may be established by an administrator command. The dispenser 2504 may be configured to enter administrator mode in response to a pre-determined command, or set of commands.

In one embodiment, a beverage dispenser may use a ticket as a machine-readable medium. The ticket may include a magnetic stripe inclusive of data specific to an available balance of a beverage. The machine may include a reader that is configured to hold in the ticket until the machine has written a new available balance to the ticket.

In one embodiment, the machine-readable medium may configured to store a monthly balance that renews at the beginning of a new month. Balances may include any form of measuring dispensed beverages such as, but not limited to, volume, time of dispensing, sensor driven measurement, or number of vessels. One of ordinary skill in the art will appreciate that many forms of measuring a beverage exist and are consistent with the methods discussed hereinabove.

In one embodiment, a machine measures an amount of a beverage dispensed and reduces an available beverage balance on a machine-readable medium by the amount of the beverage dispensed in real-time.

In one embodiment, a machine-readable medium is a card and a reader is a card reader. The card reader may hold the card during dispensing of a beverage and release the card after dispensing is complete.

In one embodiment, a threshold corresponding to a maximum volume of a beverage dispensed while a machine-readable medium is within reading distance of a reader is set. Dispensing a volume above the threshold is prevented while the machine-readable medium is within reading distance of the reader. In another embodiment, an amount of time between pours is limited so that a user cannot pour more than once within a set length of time after a previous pour.

In one embodiment, a machine for providing beverages may include a biometric sensor configured to read a biometric parameter of a user and electronics. The electronics may collect the biometric parameter of the user via the biometric sensor, and create a user profile for the user. The biometric parameter may be associated with the user profile, and a user type may be assigned to the user profile.

In one embodiment, the electronics may be further configured to, in response to receiving an administrator instruction, assign a privileged user type to the user profile. In one embodiment, the biometric sensor may include a microphone for receiving and auditory command from the user. In one embodiment, the electronics may be further configured to perform natural language processing on the auditory command from the user. In one embodiment, the electronics may be further configured to control pouring operations of the machine in response to the auditory command.

In one embodiment, the electronics may be further configured to capture a video of the user speaking the auditory commands, interpret movements of the user's lips speaking the auditory command to create data representative of predicted commands, integrate the auditory command and the predicted command from the video, and create an enhanced user command based on the integrated auditory command and predicted command.

In one embodiment, the machine may further include a speaker for communicating an auditory message to the user. In one embodiment, the auditory message may include diagnostic data of the machine in response to the user profile having a privileged user type designation.

In one embodiment, the machine may further include a reader configured to read data representative of an available balance and a machine-readable identifier for the user to obtain beverages from the machine from a machine-readable medium. In one embodiment, the electronics may be further configured to receive the data from the machine-readable medium in response to the machine-readable medium being in communication distance of the reader and associate the biometric parameter with the machine-readable identifier to form a biometric identifier and machine-readable identifier pair. After a first dispensing, the electronics may be further configured to determine whether the machine-readable identifier and biometric parameter collected for subsequent dispensings match the machine-readable identifier and biometric parameter pair. If the pair match, the electronics may be further configured to enable the user to dispense a beverage into a vessel if an available balance exists. Otherwise, the electronics may be further configured to prevent the user from dispensing a beverage into the vessel. The electronics may also be further configured to update the available balance of the machine-readable medium that reduces or prevents the user from dispensing unlimited beverages.

In one embodiment, the electronics may be further configured to enable the user to dispense the beverage while the machine-readable medium is within the communication distance of the reader.

In one embodiment, a process for providing beverages may include receiving an auditory command from a user. The auditory command may be processed to create a machine-determinable command. A command confirmation signal may be communicated to the user, and the beverage may be dispensed into a vessel thereafter. In an embodiment, voice processing may be performed to confirm whether the user is the same user as previously used the vessel by correlation of the processed voice with a vessel identifier, thereby enabling a dispenser to limit quantity of consumed beverages and prevent fraud.

In one embodiment, the process may further include reading a biometric parameter of the user via a biometric sensor, creating a user profile for the user, associating the biometric parameter with the user profile, and assigning a user type to the user profile.

In one embodiment, the process may further include, in response to receiving an administrator instruction, assigning a privileged user type to the user profile.

In one embodiment, the process may further include reading data representative of an available balance and a machine-readable identifier for the user to obtain beverages from the machine from a machine-readable medium. In one embodiment, the process may further include receiving the data from the machine-readable medium in response to the machine-readable medium being in communication distance of a reader and associating the biometric parameter with the machine-readable identifier to form a biometric identifier and machine-readable identifier pair. After a first dispensing, the process may further include determining whether the machine-readable identifier and biometric parameter collected for subsequent dispensings match the machine-readable identifier and biometric parameter pair. If the pair match, the process may further include enabling the user to dispense a beverage into a vessel if an available balance exists. Otherwise, the process may further include preventing the user from dispensing a beverage into the vessel. In one embodiment, the process may further include updating the available balance of the machine-readable medium that reduces or prevents the user from dispensing unlimited beverages.

In one embodiment, the process may further include enabling the user to dispense the beverage while the machine-readable medium is within the communication distance of the reader. In one embodiment, the processing the auditory command may include natural language processing the auditory command.

In one embodiment, the process may further include capturing a video of the user speaking the auditory command, interpreting movements of the user's lips speaking the auditory command to create data representative of a predicted command, integrating the auditory command and the predicted command from the video, and creating an enhanced user command based on the integrated auditory command and predicted command.

In one embodiment, the process may further include communicating an auditory message to the user. In one embodiment, the communicating the auditory message to the user may include communicating diagnostic data of the machine in response to the user being associated with a user profile having a privileged user type designation.

In one embodiment, a beverage dispenser may be configured to perform a voice analysis to detect specific frequencies contained therein. In response to the specific frequencies matching specific frequencies from a voice analysis performed from a first use of a vessel, the beverage dispenser may be configured to enable pouring if a maximum amount of beverage over a given time period has not been poured.

Moreover, an embodiment of a machine for providing beverages may include a reader configured to read data representative of an available balance for a user to obtain beverages from the machine from a machine-readable medium, and electronics configured to receive the data from the machine-readable medium in response to the machine-readable medium being in communication distance of the reader. The electronics may further be configured to enable the user to dispense a beverage into a vessel, and update the available balance of the machine-readable medium so as to reduce or prevent the user from dispensing unlimited beverages.

The electronics may further be configured to enable the user to dispense the beverage while the machine-readable medium is within the communication distance of the reader. The machine-readable medium may be a read/write device. The electronics are may further be configured to determine whether the data representative of the available balance is sufficient to dispense the beverage before enabling the user to dispense the beverage. The reader may use radiofrequency signaling. The electronics may further be configured to dispense a limited amount of the beverage over a time period. The electronics may communicate the data to a centrally located processor external to the machine. The machine-readable medium may be coupled to the vessel (e.g., cup), such as to the bottom of the vessel.

An embodiment of a method of providing beverages may include reading, by a reader, data representative of an available balance for a user to obtain beverages from a machine-readable medium. The data being read in response to electromagnetically communicating data from the machine-readable medium with the reader. The user may be enabled to dispense a beverage into a vessel. The data of the machine-readable medium may be updated in response to the beverage being dispensed by the user, and the user may be prevented from dispensing unlimited beverages based on the data representative of the available balance.

The machine-readable medium may be coupled to the vessel. The dispensing of the beverage may be enabled to occur when the machine-readable medium is a mobile device reader connected wirelessly to the dispenser. A determination as to whether the data meets a predetermined criteria to dispense the beverage before enabling the user to dispense the beverage may be made. An electromagnetic energy above a threshold may be output to cause an electronic device on the machine-readable medium to become non-functional. A switch that allows the beverage to be released in response to enabling the user to dispense the beverage may be toggled.

An embodiment of a machine for providing beverages may include a reader configured to read data representative of an available balance and a machine-readable identifier for a user to obtain beverages from the machine from a machine-readable medium. A biometric sensor may be configured to read a biometric parameter of the user. Electronics may be configured to collect the biometric parameter of the user via the biometric sensor. Data may be received from the machine-readable medium in response to the machine-readable medium being in communication distance of the reader. The biometric parameter may be associated with the machine-readable identifier to form a first pair. After a first dispensing, the electronics may determine whether a subsequent machine-readable identifier and subsequent biometric parameter that form a subsequent pair collected for a subsequent dispensing match the first pair. If the first and subsequent pair match, the user may be enabled by the electronics to dispense a beverage into a vessel if an available balance exists, otherwise, the user may be prevented from dispensing a beverage into the vessel. The electronics may update the available balance of the machine-readable medium so as to reduce or prevent the user from dispensing unlimited beverages. The electronics may further be configured to enable the user to dispense the beverage while the machine-readable medium is within the communication distance of the reader.

An embodiment of a method of providing beverages may include reading, by a reader, data representative of an available balance and a machine-readable identifier for a user to obtain beverages from a machine-readable medium, the data being read in response to electronically communicating the data from the machine-readable medium to the reader. A biometric parameter of the user may be collected. The biometric parameter may be associated with the machine-readable identifier to form a first pair. After a first dispensing, a determination as to whether a subsequent machine-readable identifier and subsequent biometric parameter that form a subsequent pair collected for a subsequent dispensing match the first pair. If the first and subsequent pair match, the user may be enabled to dispense a beverage into a vessel if an available balance exists, otherwise, the user may be prevented from dispensing the beverage into the vessel. The data of the machine-readable medium may be updated so as to prevent the user from dispensing unlimited beverages.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A system comprising:
 a vessel comprising:
  a substantially flat bottom surface; and
  a machine-readable medium adhesively coupled to the flat bottom surface, the machine-readable medium comprising:
   a chip including a read-write device;
   an antenna communicably coupled to the chip; and
   an adhesive strap adhesively coupling the chip and the antenna to the flat bottom surface of the vessel, the adhesive strap including a first and second winged portion and a central portion, the chip being adhesively coupled by the central portion of the adhesive strap to the flat bottom surface and the antenna being adhesively coupled by the first and second winged portions to the flat bottom surface; and
 a machine for providing beverages, said machine comprising:
  a reader configured to read data representative of an available balance for a user to obtain beverages from the machine from the machine-readable medium of the vessel; and
  electronics configured to:
   receive the data from the machine-readable medium in response to the machine-readable medium being in communication distance of the reader;
   enable the user to dispense a beverage into the vessel;
   transmit an updated available balance of the machine-readable medium to the machine-readable medium, to cause the machine-readable medium to update the available balance so as to reduce or prevent the user from dispensing unlimited beverages; and
   prevent the user from dispensing unlimited beverages based on the data representative of the available balance, wherein preventing the user from dispensing the unlimited beverages comprises outputting an electromagnetic energy above a threshold to cause the chip of the machine-readable medium to become non-functional.

2. The system according to claim 1, wherein the electronics are further configured to enable the user to dispense the beverage while the machine-readable medium is within the communication distance of the reader.

3. The system according to claim 1, wherein the electronics are further configured to determine whether the data representative of the available balance is sufficient, based on the data received from the machine-readable medium, to dispense the beverage before enabling the user to dispense the beverage.

4. The system according to claim 1, wherein the reader uses radiofrequency signaling.

5. The system according to claim 1, wherein the electronics are further configured to limit an amount of the beverage dispensed from the machine over a time period.

6. The system according to claim 1, wherein the electronics communicate the data to a centrally located processor external to the machine.

7. The system according to claim 1, said machine further comprising:
 a biometric sensor configured to read a biometric parameter of the user; and
 the electronics further configured to:
  collect the biometric parameter of the user via said biometric sensor;
  associate the biometric parameter with the machine-readable identifier to form a first pair;
  after a first dispensing, determine whether a subsequent machine-readable identifier and subsequent biometric parameter that form a subsequent pair collected for a subsequent dispensing match the first pair; and if the first and subsequent pair match, enable the user to dispense a beverage into a vessel if an available balance exists, otherwise, prevent the user from dispensing a beverage into the vessel.

8. The system according to claim 1, wherein the available balance comprises a total number of beverages, a total number of fluid ounces, or a total number milliliters, and includes an associated time period.

9. The system according to claim 8, wherein enabling the user to dispense the beverage into the vessel is responsive to the total number of beverages, total number of fluid ounces, or total number of milliliters being greater than or equal to one, and a maximum amount of the beverage has not been poured over the associated time period.

10. The system according to claim 1, wherein the chip is positioned along the adhesive strap, and the antenna spans from a first portion of the adhesive strap to a second portion of the adhesive strap.

11. A method of providing beverages, said method comprising:
providing a vessel including a machine-readable medium adhesively coupled to a flat bottom surface of a vessel, wherein the machine-readable medium comprises a chip, an antenna communicably coupled to the chip, and an adhesive strap adhesively coupling the chip and the antenna to the flat bottom surface of the vessel, the adhesive strap including a first and second winged portion and a central portion, the chip being adhesively coupled by the central portion of the adhesive strap to the flat bottom surface and the antenna being adhesively coupled by the first and second winged portions to the flat bottom surface;
providing a machine for dispensing beverages into the vessel, the machine comprising a reader for reading data from the machine-readable medium;
reading, by the reader, the data representative of an available balance for a user from the machine-readable medium of the vessel, the data being read in response to electromagnetically communicating data from the machine-readable medium with the reader;
enabling the user to dispense a beverage into the vessel;
transmitting an updated available balance to the machine-readable medium, to cause the machine-readable medium to update the available balance in response to the beverage being dispensed by the user;
preventing the user from dispensing unlimited beverages based on the data representative of the available balance; and
outputting an electromagnetic energy above a threshold to cause an electronic device on the machine-readable medium coupled to the vessel to become non-functional.

12. The method according to claim 11, wherein enabling the dispensing of the beverage occurs when the machine-readable medium is connected wirelessly to the dispenser.

13. The method according to claim 11, further comprising determining whether the data meets a predetermined criteria to dispense the beverage before enabling the user to dispense the beverage.

14. The method according to claim 11, further comprising:
collecting a biometric parameter of the user;
associating the biometric parameter with the machine-readable identifier to form a first pair;
after a first dispensing, determining whether a subsequent machine-readable identifier and subsequent biometric parameter that form a subsequent pair collected for a subsequent dispensing match the first pair; and
if the first and subsequent pair match, enabling the user to dispense a beverage into a vessel if an available balance exists, otherwise, preventing the user from dispensing the beverage into the vessel.

15. A system comprising:
a vessel comprising:
a substantially flat bottom surface; and
a machine-readable medium adhesively coupled to the flat bottom surface, the machine-readable medium comprising:
a chip including a read-write device;
an antenna communicably coupled to the chip; and
an adhesive strap adhesively coupling the chip and the antenna to the flat bottom surface of the vessel, the adhesive strap including a first and second winged portion and a central portion, the chip being adhesively coupled by the central portion of the adhesive strap to the flat bottom surface and the antenna being adhesively coupled by the first and second winged portions to the flat bottom surface; and
a machine for providing beverages, said machine comprising:
a biometric sensor configured to read a biometric parameter of a user;
a reader configured to read data representative of an available balance for the user to obtain beverages from the machine from the machine-readable medium to be dispensed in the vessel; and
electronics configured to:
collect the biometric parameter of the user via said biometric sensor;
create a user profile for the user;
associate the biometric parameter with the user profile and with the machine-readable medium in response to the machine-readable medium being in communication distance of the reader;
assign a user type to the user profile; and
control pouring operations of the machine in response to an auditory command, wherein the electronics, in controlling pouring operations, are configured to:
receive data from the machine-readable medium in response to the machine-readable medium being in the communication distance of the reader;
enable the user to dispense a beverage into the vessel;
transmit an updated available balance of the machine-readable medium to the machine-readable medium, to cause the machine-readable medium to update the available balance so as to reduce or prevent the user from dispensing unlimited beverages; and
prevent the user from dispensing unlimited beverages based on the data representative of the available balance, wherein preventing the user from dispensing the unlimited beverages comprises outputting an electromagnetic energy above a threshold to cause an electronic device on the machine-readable medium to become non-functional.

16. The system according to claim 15, wherein said biometric sensor includes a microphone for receiving an auditory command from the user.

17. The system according to claim 15, wherein said electronics are further configured to:
- capture a video of the user speaking the auditory commands
- interpret movements of the user's lips speaking the auditory command to create data representative of predicted commands;
- integrate the auditory command and the predicted command from the video; and
- create an enhanced user command based on the integrated auditory command and predicted command.

18. The system according to claim 15, wherein said electronics are further configured to:
- receive the data from the machine-readable medium in response to the machine-readable medium being in communication distance of the reader;
- associate the biometric parameter with the machine-readable identifier to form a first pair;
- after a first dispensing, determine whether a subsequent machine-readable identifier and subsequent biometric parameter that form a subsequent pair collected for a subsequent dispensing match the first pair;
- if the first and subsequent pair match, enable the user to dispense a beverage into a vessel if an available balance exists, otherwise, prevent the user from dispensing a beverage into the vessel; and
- update the available balance of the machine-readable medium so as to reduce or prevent the user from dispensing unlimited beverages.

* * * * *